(12) United States Patent
Tsukui et al.

(10) Patent No.: US 6,318,316 B1
(45) Date of Patent: Nov. 20, 2001

(54) MULTI-CYLINDER ENGINE FOR MOTORCYCLE

(75) Inventors: Takaaki Tsukui; Sakae Mizumura, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/480,651

(22) Filed: Jan. 11, 2000

(30) Foreign Application Priority Data

Jan. 11, 1999 (JP) .................................................. 11-004629

(51) Int. Cl.[7] ............................. F01M 1/16; F01L 13/00
(52) U.S. Cl. ................................. 123/90.16; 123/90.33; 123/198 F; 123/193.3
(58) Field of Search .......................... 123/90.12, 90.15, 123/90.16, 90.17, 90.33, 198 F, 193.3, 193.5

(56) References Cited

U.S. PATENT DOCUMENTS

| | | | |
|---|---|---|---|
| 4,938,187 | * | 7/1990 | Seki ...................................... 123/333 |
| 5,423,295 | * | 6/1995 | Murata et al. ..................... 123/90.16 |
| 5,537,963 | * | 7/1996 | Hasebe et al. ..................... 123/90.16 |
| 5,758,612 | * | 6/1998 | Tsuzuku et al. ................... 123/90.16 |

FOREIGN PATENT DOCUMENTS

Y26-34563    9/1994  (JP) .

* cited by examiner

*Primary Examiner*—Weilun Lo
(74) *Attorney, Agent, or Firm*—Birch, Stewart, Kolasch & Birch, LLP

(57) ABSTRACT

To provide a multi-cylinder engine for a motorcycle, in which at least one of a plurality of engine valves provided in a cylinder head for each of combustion chambers corresponding to a plurality of cylinder bores arranged in the width direction of a body frame can be rested in a specific operational region by a hydraulic valve resting mechanism. A hydraulic control valve is provided for controlling the hydraulic pressure of working oil supplied to the valve resting mechanism and is mounted on the cylinder head. The length of the multi-cylinder engine along the width direction of the body frame is made as short as possible although the hydraulic control valve is mounted in the cylinder head. A hydraulic control valve is mounted on a side surface of a cylinder head to which a plurality of intake ports are opened along the longitudinal direction of a body frame.

14 Claims, 14 Drawing Sheets

MULTI-CYLINDER ENGINE FOR MOTORCYCLE

BACKGROUND OF THE INVENTION

1. Field of the Invention

The present invention relates to a multi-cylinder engine for a motorcycle, including a cylinder block having a plurality of cylinder bores arranged in the width direction of a body frame, a cylinder head connected to the cylinder block with combustion chambers formed between pistons slidably fitted in the cylinder bores and the cylinder head, intake valves and exhaust valves provided in the cylinder head for each of the combustion chambers, a hydraulic valve resting mechanism capable of resting, in a specific operational region, at least one of the intake valves and the exhaust valves, and a hydraulic control valve mounted on the cylinder head for controlling the hydraulic pressure of working oil supplied to the valve resting mechanism.

2. Description of Background Art

A multi-cylinder engine in which a hydraulic control valve for controlling the hydraulic pressure of working oil supplied to a valve resting mechanism is mounted in a cylinder head has been known, for example, from Japanese Utility Model Publication No. Hei 6-34563.

In a motorcycle in which a multi-clinder engine is mounted on a body frame in such a manner that a plurality of cylinder bores provided in a cylinder block are arranged along the width direction of the body frame, it is expected that the length of the multi-cylinder engine along the arrangement direction of the cylinder bores, that is, along the width direction of the body frame is made as short as possible. In the multi-cylinder engine disclosed in the above document. However, the hydraulic control valve is mounted on the cylinder head on one end side along the arrangement direction of the cylinder bores, and accordingly, if such an engine is applied to a motorcycle, it is required to ensure a space in which the hydraulic control valve is disposed in the width direction of the body frame, so that it is difficult to shorten the length of the multi-cylinder cylinder engine along the width direction of the body frame.

SUMMARY AND OBJECTS OF THE INVENTION

In view of the foregoing, the present invention has been made, and an object of the present invention is to provide a multi-cylinder engine for a motorcycle, which is capable of making the length of the engine in the width direction of a body frame as short as possible although a hydraulic control valve is mounted on a cylinder head.

To achieve the above object, according to the present invention, there is provided a multi-cylinder engine for a motorcycle, including: a cylinder block having a plurality of cylinder bores arranged in the width direction of a body frame; a cylinder head connected to the cylinder block with combustion chambers formed between pistons slidably fitted in the cylinder bores and the cylinder head; a hydraulic valve resting mechanism capable of resting, in a specific operational region, at least one of a plurality of kinds of engine valves provided in the cylinder head for each of the combustion chambers; and a hydraulic control valve, mounted on the cylinder head, for controlling the hydraulic pressure of working oil supplied to the valve resting mechanism; wherein the hydraulic control valve is mounted on a side surface of the cylinder head to which a plurality of intake ports individually corresponding to the combustion chambers are opened along the longitudinal direction of the body frame.

With this configuration, since the hydraulic control valve is mounted on the side surface of the cylinder head in the longitudinal direction of the body frame, that is, in the direction perpendicular to the arrangement direction of the cylinder bores, it is possible to avoid an inconvenience that the length of the multi-cylinder engine along the arrangement direction of the cylinder bores becomes large due to the mounting of the hydraulic control valve on the cylinder head, and hence to make the length of the multi-cylinder engine along the width direction of the body frame as short as possible and prevent adverse effect of exhaust heat from being exerted on the hydraulic control valve.

According to the present invention, the hydraulic control valve is mounted on the side surface of the cylinder head at a position between two adjacent intake ports. With this configuration, it is possible to dispose the hydraulic control valve by making effective use of a space between the two adjacent intake ports, and hence to make shorter the length of the multi-cylinder engine along the width direction of the body frame.

According to the present invention, a working oil intake passage for introducing working oil from an oil pump to the hydraulic control valve is provided in the cylinder head, the cylinder block, and a crank case. With this configuration, it is possible to eliminate the necessity of the provision of an additional pipe line for introducing working oil from the oil pump to the hydraulic control valve and hence to simplify the appearance of the multi-cylinder engine.

According to the present invention, a water jacket is provided in the cylinder block and the cylinder head, and two parts, corresponding to the cylinder block and the cylinder head, of the working oil intake passage are disposed outside the water jacket. with this configuration, it is possible to effectively cool working oil flowing in the working oil intake passage.

According to the present invention, the working oil intake passage includes: a first passage provided in the cylinder head in such a manner as to extend in a straight line along the side surface in a region between the side surface on which the hydraulic control valve is mounted and the water jacket; a second passage provided in the cylinder block in such a manner as to be coaxially connected to the first passage; and a third passage provided in the crank case connected to the cylinder block in such a manner as to be coaxially connected to the second passage and to extend in a straight line therefrom.

With this configuration, it is possible to make the working oil route from the oil pump to the hydraulic control valve as short as possible and hence to make a loss in hydraulic pressure in the working oil intake passage as small as possible.

According to the present invention, a containing hole for containing a means for driving cam shafts is provided in the cylinder head at a position between the adjacent two, on the central side along the arrangement direction, of the cylinder bores of the even number of four or more in such a manner as to partition the cylinder head into first and second head portions located on both sides of the containing hole. A first working oil discharge passage is provided for supplying working oil to the valve resting mechanism for each of the combustion chambers on the first head portion side in the first head portion. The passage being connected to the hydraulic control valve mounted on the side surface of the cylinder head at a position between a pair of the intake ports of a plurality of the intake ports arranged on the first head portion side. A second working oil discharge passage is provided for supplying working oil to the valve resting mechanism for each of the combustion chambers on the second head portion side in the second head portion. One-end of the first and second working oil discharge passages is opened to a mounting seat formed on the side surface of the cylinder head in such a manner as to cross between the first and second head portions. The first and second working oil discharge passages are communicated to each other via a cover fastened to the mounting seat.

With this configuration, the containing hole for containing the means for driving the cam shafts is provided in the cylinder head at a position between the adjacent two, on the central side along the arrangement direction of the cylinder bores, of the cylinder bores, it is possible to keep the desirable balance of the cylinder head along arrangement direction of the cylinder bores, and thereby the desirable balance of the multi-cylinder engine as a whole, and also it is possible to simply communicate the first and second working oil discharge passages provided in the cylinder head on both sides of the containing hole and hence to effectively supply working oil discharged from the single hydraulic control valve to the valve resting mechanism for each of the combustion chambers.

Further scope of applicability of the present invention will become apparent from the detailed description given hereinafter. However, it should be understood that the is detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
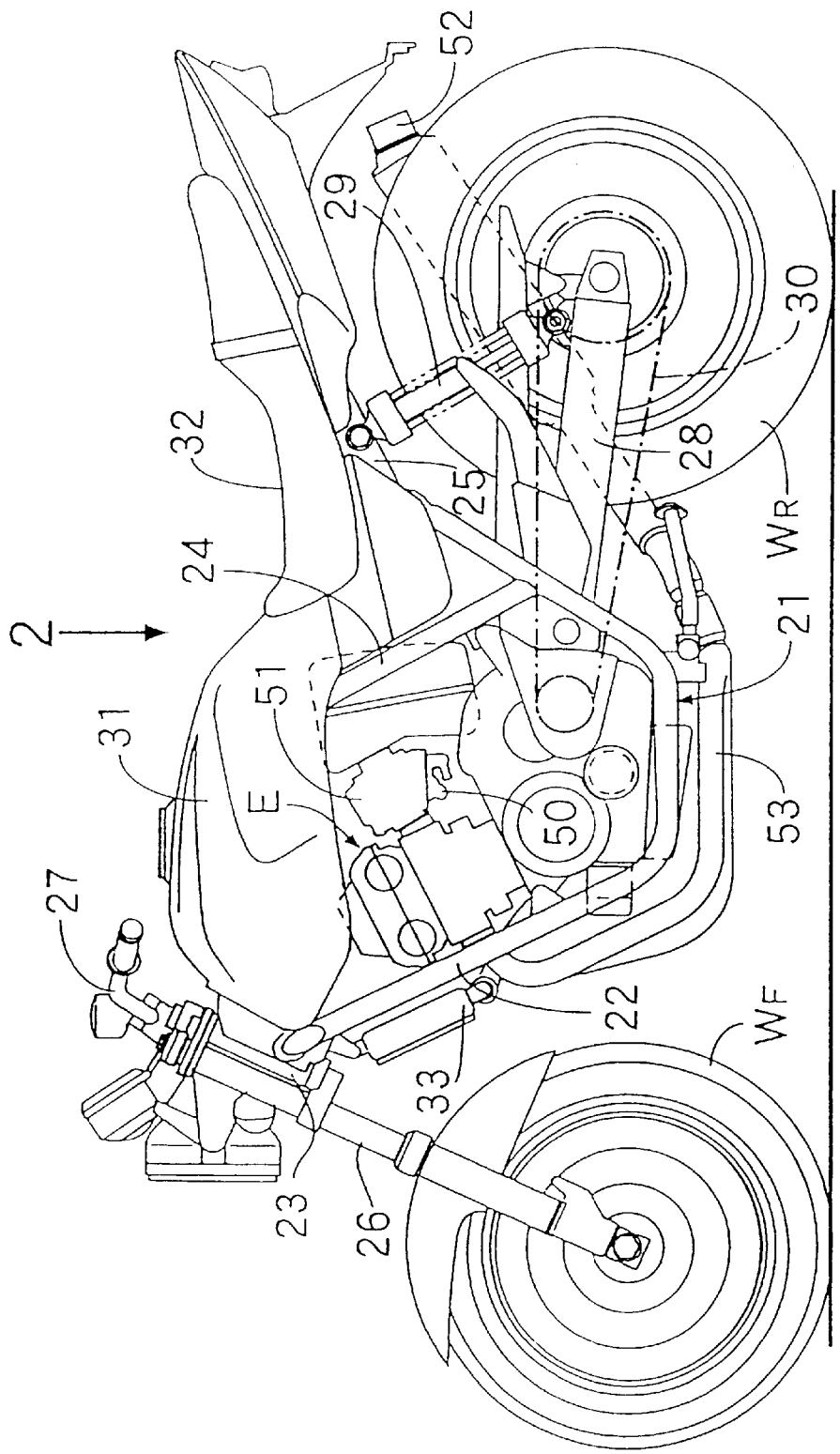
FIG. 1 is a side view of a motorcycle.
Figure 2:
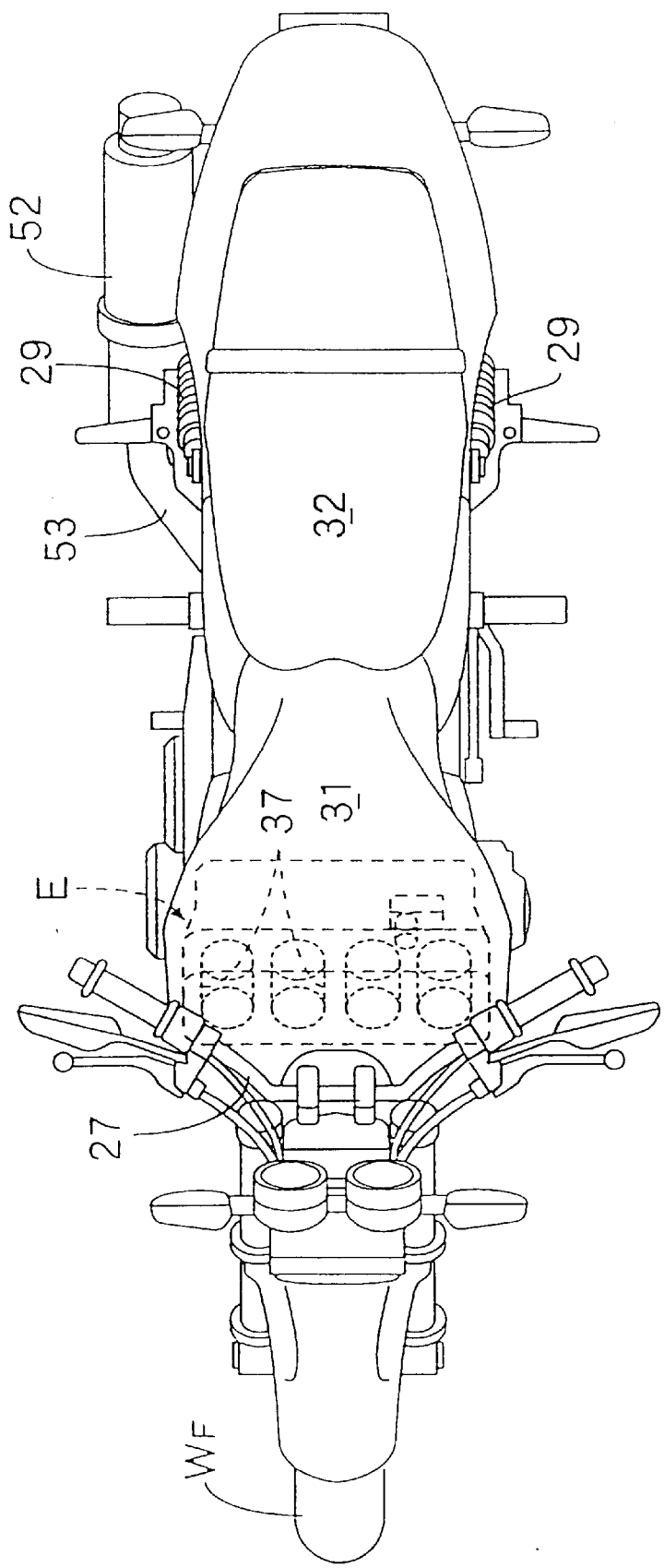
FIG. 2 is a plan view seen from an arrow 2 of FIG. 1.

Referring first to FIGS. 1 and 2, a body frame 21 of this motorcycle includes a pair of right and left main frames 22 each being formed into an approximately U-shape opened upwardly. A head pipe 23 is provided at front ends of the main frames 22. A connection frame 24, that is formed into an approximately U-shape opened downwardly, is provided for connecting rear portions of the main frames 22 to each other. A seat stay 25 is connected to rear ends of the main frames 22 and extends rearwardly, obliquely upwardly therefrom. A front fork 26 for supporting a front wheel $W_F$, is steerably supported by the head pipe 23. A steering handle 27 is operatively connected to the front fork 26. A rear fork 28 for supporting a rear wheel $W_R$, is vertically swingably supported by a rear portion of one of the main frames 22. A pair of cushion units 29 are provided between the seat stay 25 and the rear wheel $W_R$.

An engine E is supported by the main frames 22 and the connecting frame 24. Power from the engine E is transmitted to the rear wheel $W_R$, via a transmission assembled in the engine E and a chain transmission 30.

A fuel tank 31 is mounted on the right and left main frames 22 and the connection frame 24 in such a manner as to be positioned over the engine E. A tandem seat 32 is mounted on the seat stay 25, and a radiator 33 is disposed in front of the engine E.

Figure 3:
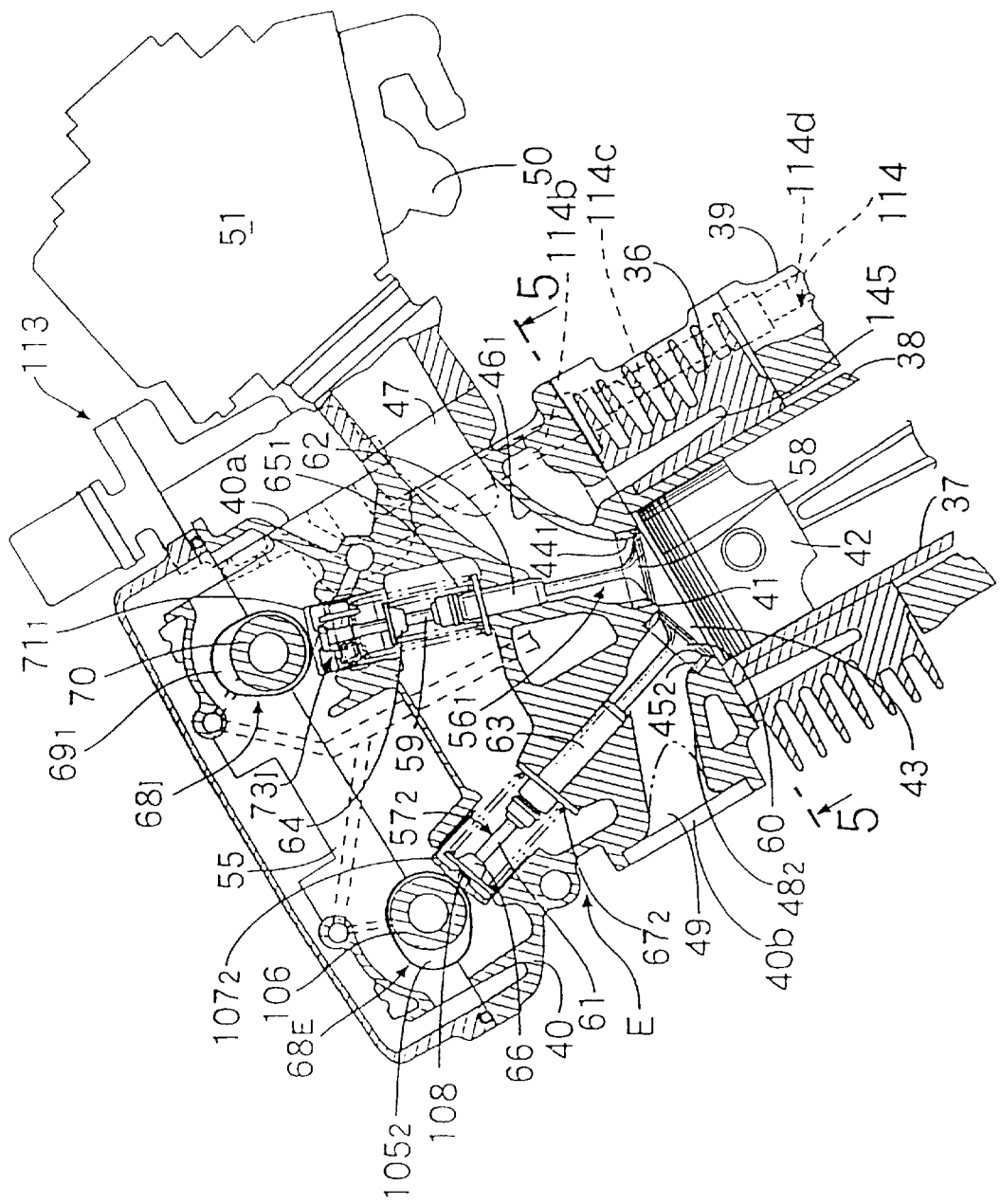
FIG. 3 is a partial vertical sectional view, taken on line 3—3 of FIG. 5, of an upper portion of an engine.
Figure 4:
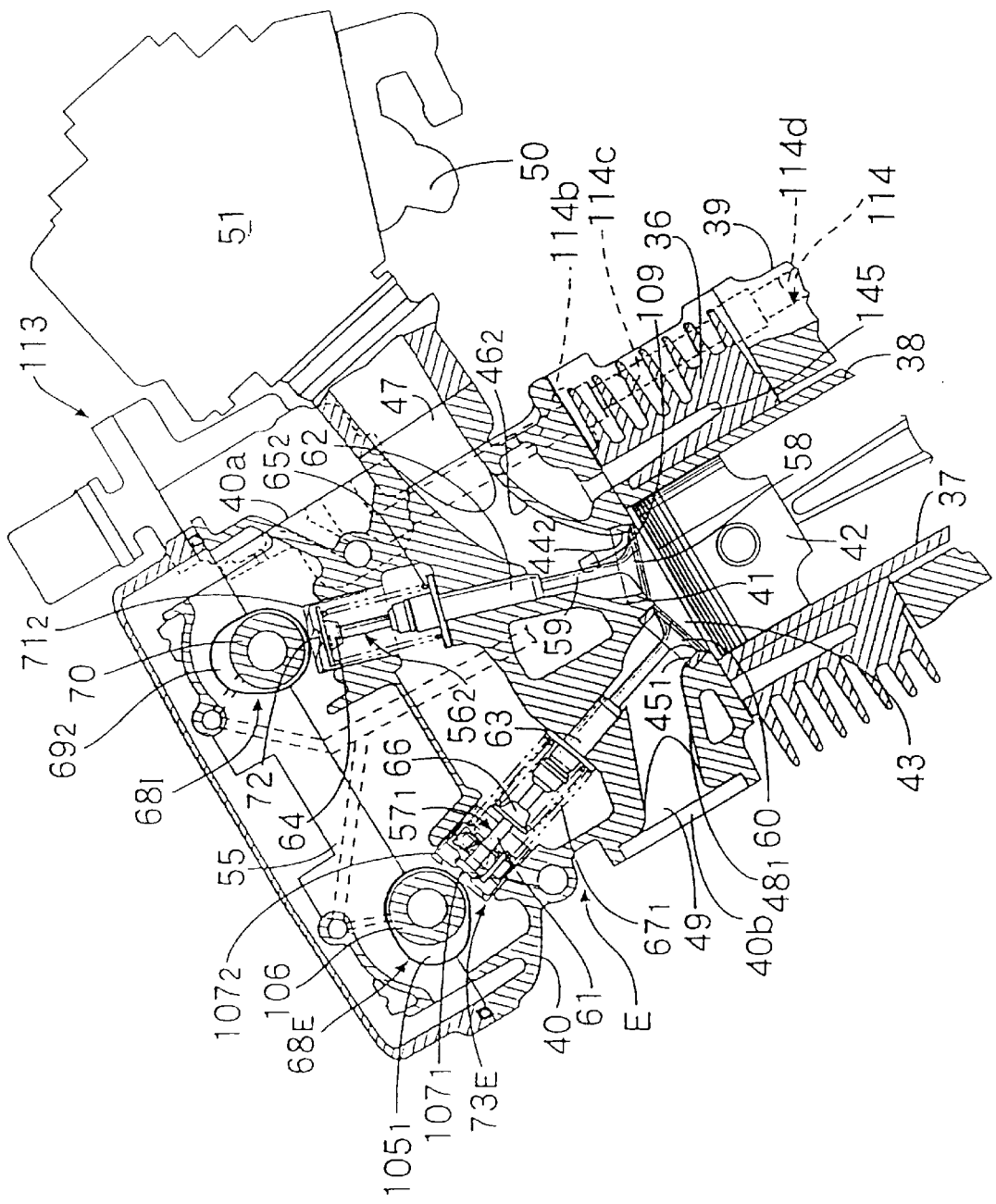
FIG. 4 is a transverse sectional view, taken on line 4—4 of FIG. 5, of the upper portion of the engine.

Referring additionally to FIGS. 3 and 4, the engine E is a multi-cylinder for example, a four-cylinder/four-cycle engine. A plurality (for example, four) of cylinder bores 37 are formed in a cylinder block 36 of the engine E in such a manner as to be arranged along the width direction of the body frame 21. The cylinder bores 37 are tilted upwardly, forwardly in the running direction of the motorcycle. To be more specific, cylinder liners 38 for forming the cylinder bores 37 are fixed in the cylinder block 36 in such a manner as to be spaced from each other at intervals along the width direction of the body frame 21. Each cylinder liner 38 is partially inserted in an upper crank case 39 connected to a lower portion of the cylinder block 36.

A cylinder block 40 is connected to an upper portion of the cylinder block 36. Recesses 41 that individually correspond to the cylinder bores 37 are provided in a connection plane of the cylinder head 40 to the cylinder block 36. Combustion chambers 43 including the recesses 41 are formed between the cylinder head 40 and top portions of pistons 42 slidably fitted in the cylinder bores 37.

Figure 5:
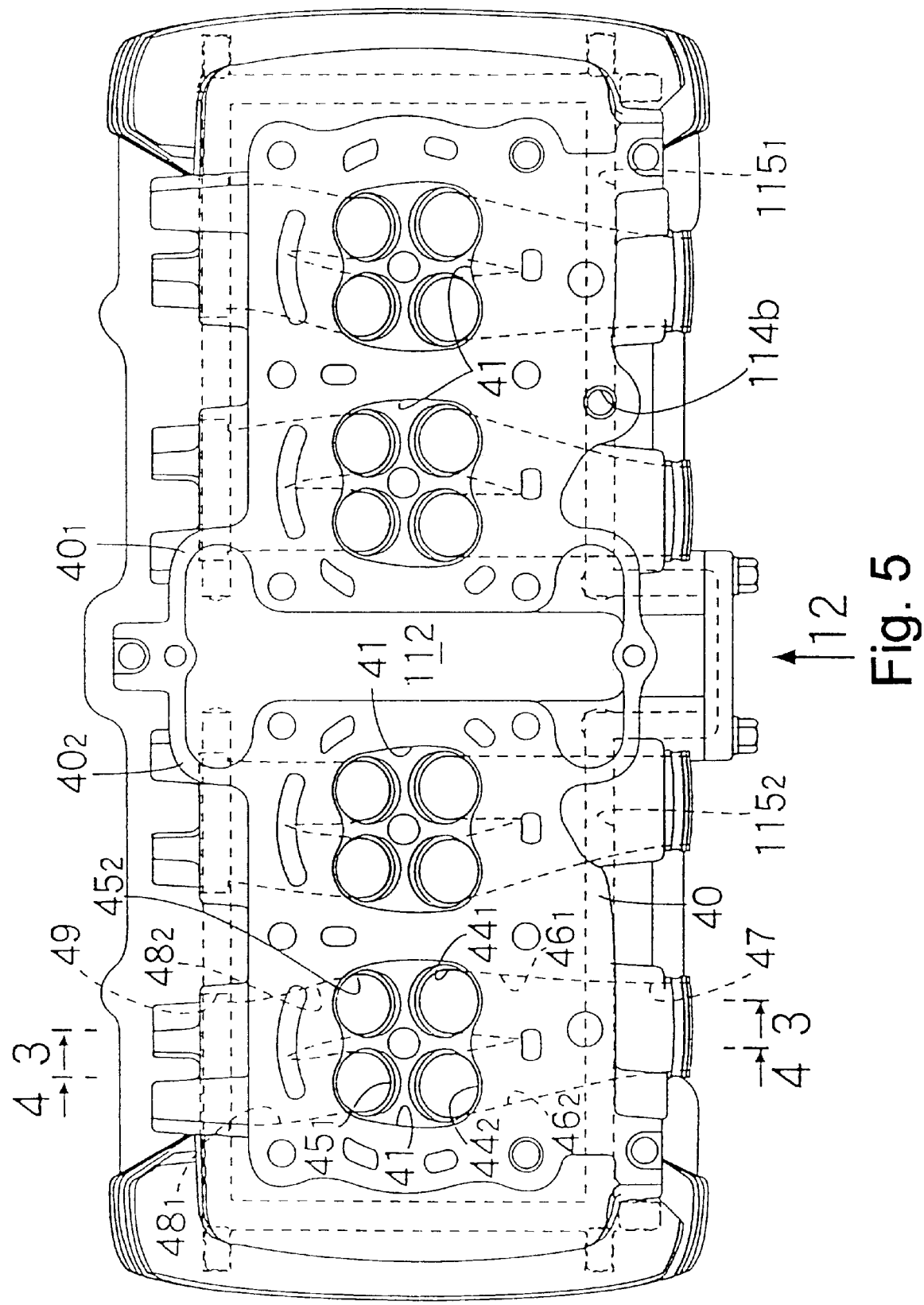
FIG. 5 is a bottom view, seen from arrows 5—5 of FIG. 3, of a cylinder head.

Referring additionally to FIG. 5, a plurality (for example, a pair) of first and second intake valve ports $44_1$ and $44_2$ opened to the combustion chamber 43, and a plurality of (for example, a pair) of first and second exhaust valve ports $45_1$ and $45_2$ opened to the combustion chamber 43 are provided in the cylinder head 40. The first intake valve port $44_1$ and the first exhaust valve port $45_2$ are substantially symmetrically disposed with respect to the center of the combustion chamber 43, and the second intake valve port $44_2$ and the second exhaust valve port $45_2$ are substantially symmetrically disposed with respect to the center of the combustion chamber 43.

Figure 6:
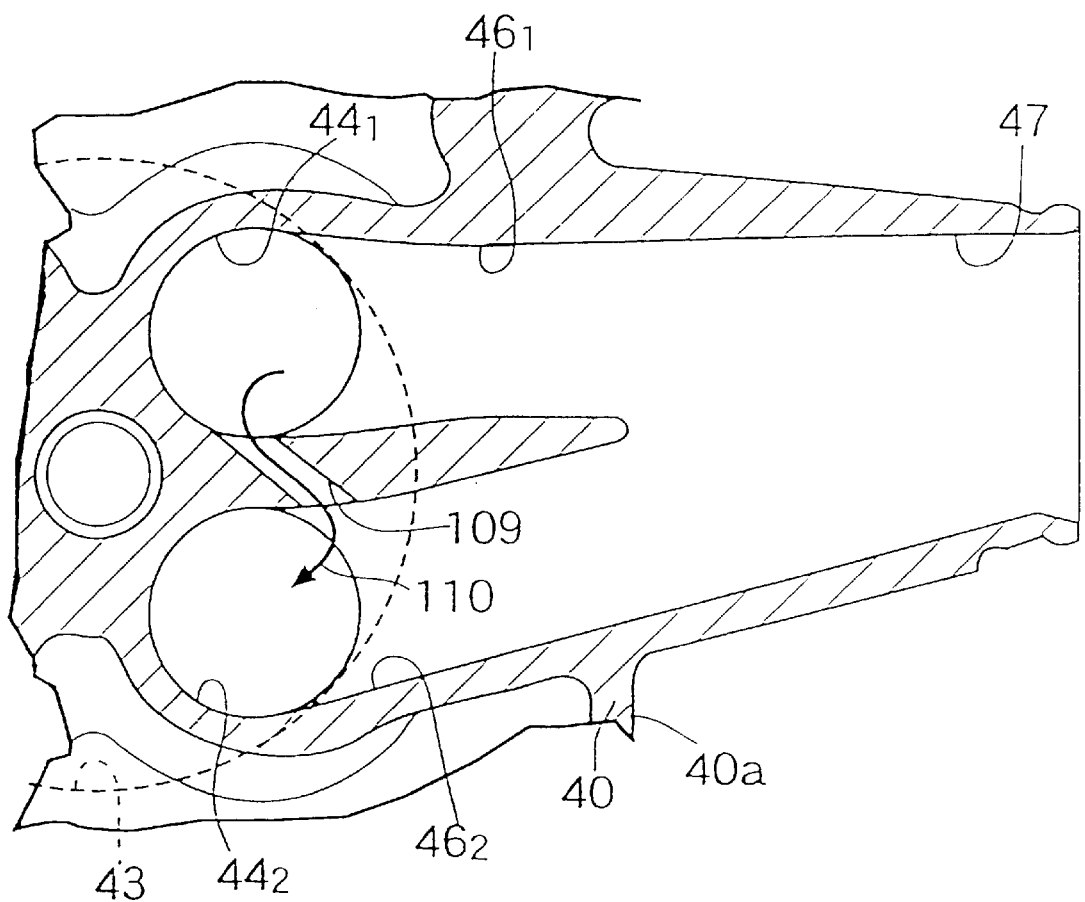
FIG. 6 is a partial transverse sectional view of the cylinder head near an intake port.

Referring additionally to FIG. 6, a first intake passage $46_1$ connected to the first intake valve port $44_1$ a second intake passage $46_2$ connected to the second intake valve port $44_2$ and an intake port 47 commonly connected to the first and second intake passages $46_1$ and $46_2$ and opened to one side surface 40a of the cylinder head 40 are provided in the cylinder head 40. The one side surface 40a of the cylinder head 40 to which each intake port 47 is opened is disposed on the back side along the running direction of the motorcycle.

A first exhaust passage $48_1$ connected to the first exhaust valve port $45_1$ a second exhaust passage $48_2$ connected to the second exhaust valve port $45_2$ and an intake port 49 commonly connected to the first and second exhaust passages $48_1$, and $48_2$ and opened to the other side surface 40b of the cylinder head 40 are provided in the cylinder head 40 for each combustion chamber 43. The other side surface 40b of the cylinder head 40 to which each exhaust port 49 is opened is disposed on the front side along the running direction of the motorcycle.

An intake system 51 including a carburetor 50 common to the intake ports 47 is connected to the intake ports 47. An exhaust system 53 including an exhaust muffler 52 is connected to the exhaust ports 49. The exhaust muffler 52 is disposed on the right side of the rear wheel $W_R$ in a state being directed forwardly in the running direction of the motorcycle.

Referring to FIGS. 3 and 4, the communication and cutoff between the first intake valve port $44_1$ and the first intake passage $46_1$ is switched from each other by a first intake valve $56_1$ as an engine valve and the communication and cutoff between the second intake valve port $44_2$ and the second intake passage $46_2$ is switched from each other by a second intake valve $56_2$. Meanwhile, the communication and cutoff between the first exhaust valve port $45_1$ and the first exhaust passage $48_1$ is switched from each other by a first exhaust valve $57_1$ as an engine valve, and the communication and cutoff between the second exhaust valve port $45_2$ and the second exhaust passage $48_2$ is switched from each other by a second exhaust valve $57_2$ as an engine valve.

Each of the first and second intake valves $56_1$ and $56_2$ includes a valve body 58 capable of closing the associated one of the intake valve ports $44_1$ and $44_2$ and a valve stem 59 having the base end integrally connected to the valve body 58. Each of the first and second exhaust valves $57_1$ and $57_2$ includes a valve body 60 capable of closing the associated one of the exhaust valve ports $45_1$ and $45_2$ and a valve stem 61 having the base end integrally connected to the valve body 60.

The valve stem 59 of each of the first and second intake valves $56_1$ and $56_2$ is slidably fitted in a guide cylinder 62 provided in the cylinder head 40. The valve stem 61 of each of the first and second exhaust valves $57_1$ and $57_2$ is slidably fitted in a guide cylinder 63 provided in the cylinder head 40.

A retainer 64 is fixed via split cotters (not shown) to an intermediate point of a portion, projecting upwardly from the guide cylinder 62, of the valve stem 59 of the first intake valve $56_1$. A coil valve spring $65_1$ is provided between the retainer 64 and the cylinder head 40, whereby the first intake valve $56_1$ is biased in the direction of closing the first intake port $44_1$ by the valve spring $65_1$. Meanwhile, a retainer 64 is fixed via split cotters (not shown) to the leading end of a portion, projecting upwardly from the guide cylinder 62, of the valve stem 59 of the second intake valve $56_2$. A coil valve spring $65_2$ is provided between the retainer 64 and the cylinder head 40, whereby the second intake valve $56_2$ is biased in the direction of closing the second intake port $42_2$ by the valve spring $65_2$.

A retainer 66 is fixed via split cotters (not shown) to an intermediate point of a portion, projecting upwardly from the guide cylinder 63, of the valve stem 61 of the first exhaust valve $57_1$. A coil valve spring $67_1$ is provided between the retainer 66 and the cylinder head 40, whereby the first exhaust valve $57_1$ is biased in the direction of closing the first exhaust port $45_1$ by the valve spring $67_1$. Meanwhile, a retainer 66 is fixed via split cotters (not shown) to the leading end of a portion, projecting upwardly from the guide cylinder 63, of the valve stem 61 of the second exhaust valve $57_2$. A coil valve spring $67_2$ is provided between the retainer 66 and the cylinder head 40, whereby the second exhaust valve $57_2$ is biased in the direction of closing the second exhaust port $45_2$ by the valve spring $67_2$.

An intake side valve system 681 for driving the first and second intake valves $56_1$ and $56_2$ of the combustion chambers 43 includes a cam shaft 70, bottomed cylindrical valve lifters $71_1$ and bottomed cylindrical valve lifters $71_2$. The cam shaft 70 has first intake side valve system cams $69_1$ corresponding to the first intake valves $56_1$ and the second intake side valve system cams $69_2$ corresponding to the second intake valves $56_2$. The valve lifters $71_1$ are supported by the cylinder head 40 in such a manner as to be slidably driven by the first intake side valve system cams $69_1$. The valve lifters $71_2$ are supported by the cylinder head 40 in such a manner as to be slidably driven by the second intake side valve system cams $69_2$.

The cam shaft 70 has an axial line perpendicular to the extensions of the axial lines of the valve stems 59 of the first and second intake valves $56_1$ and $56_2$ and is rotatably supported between the cylinder head 40 and a holder 55 connected to the is cylinder head 40. The valve lifters $71_1$ are slidably fitted in the cylinder head 40 in such a manner as to be slidably movable in the same axial direction as the axial lines of the valve stems 59 of the first intake valves $56_1$. The outer surface of the closed end of each valve lifter $71_1$ is in slide-contact with the associated one of the first intake side valve system cams $69_1$. The valve lifters $71_2$ are slidably fitted in the cylinder head 40 in such a manner as to be slidably movable in the same axial direction as the axial lines of the valve stems 59 of the second intake valves $56_2$. The outer surface of the closed end of each valve lifter $71_2$ is in slide-contact with the associated one of the second intake side valve system cams $69_2$.

The leading end of the valve stem 59 of the second intake valve $56_2$ is in contact with the inner surface of the closed end of the valve lifter $71_2$ via a shim 72. The second intake valve $56_2$ is, during the operation of the engine E, usually operated to be opened/closed by the second intake side valve system cam $69_2$. On the other hand, a valve resting mechanism 73I is provided between the valve stem 59 of the first intake valve $56_1$ and the valve lifter $71_1$. The valve resting mechanism 73I can switch an acting state and a non-acting state of a pressing force applied from the valve lifter $71_1$ to the first intake valve $56_1$ in the valve opening direction. To be more specific, in a specific operational region, typically, a low speed operational region of the engine E, the valve resting mechanism 73I creates the non-acting state of the pressing force, thereby turning the first intake valve $56_1$ into the resting state irrespective of the sliding motion of the valve lifter $71_1$.

Figure 7:
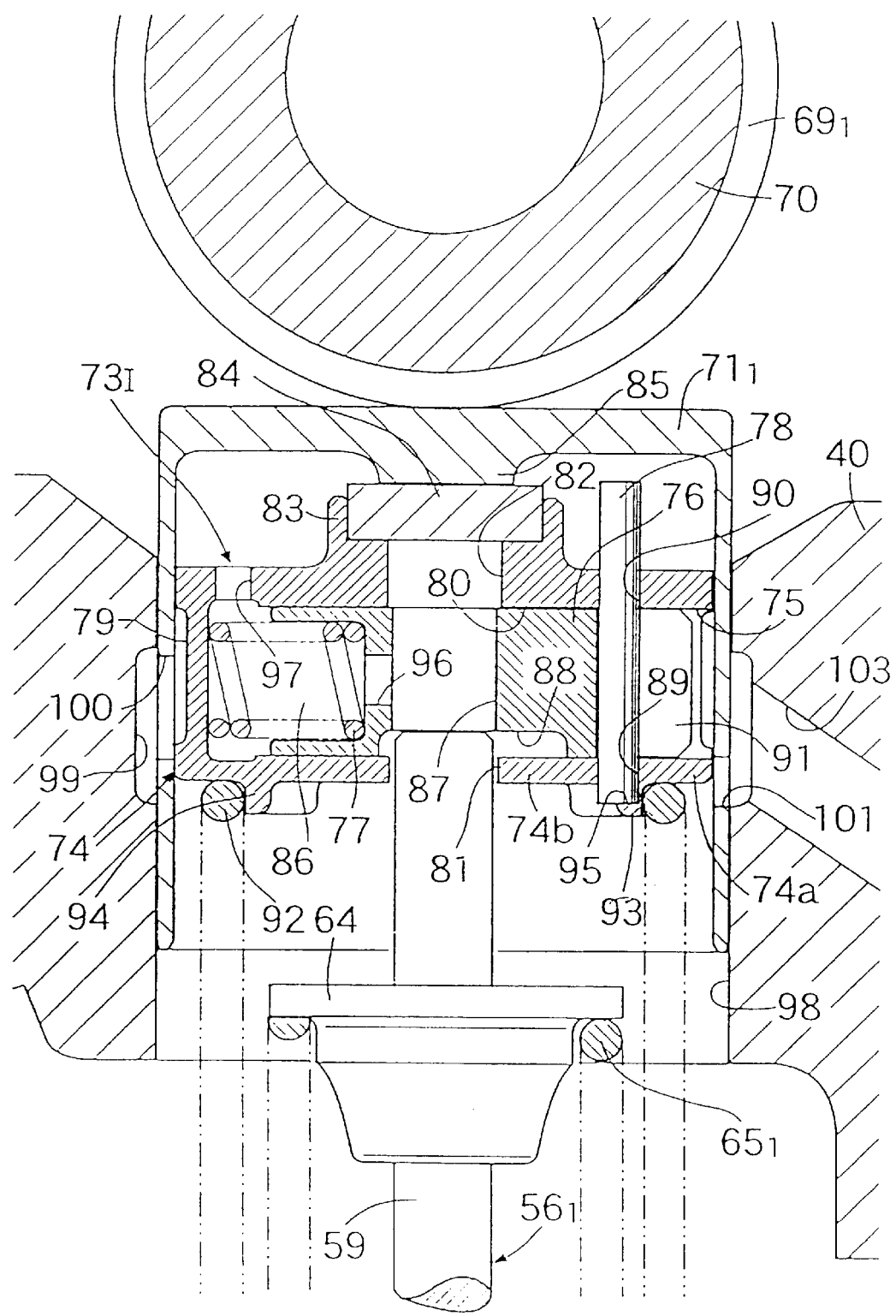
FIG. 7 is an enlarged vertical sectional view of a valve resting mechanism.

Referring to FIG. 7, the valve resting mechanism 73 includes a pin holder 74 slidably fitted in the valve lifter $71_1$. A slide pin 76 is slidably fitted in the pin holder 74 in such a manner as to form a hydraulic chamber 75 between the inner surface of the valve lifter $71_1$ and the slide pin 76. A return spring 77 is provided between the slide pin 76 and the pin holder 74, for biasing the slide pin 76 in the direction of reducing the volume of the hydraulic chamber 75. A stopper pin 78, functioning as a rotation stopping means, is provided between the pin holder 74 and the slide pin 76, for stopping the rotation of the slide pin 76 around its axial line.

Figure 8:
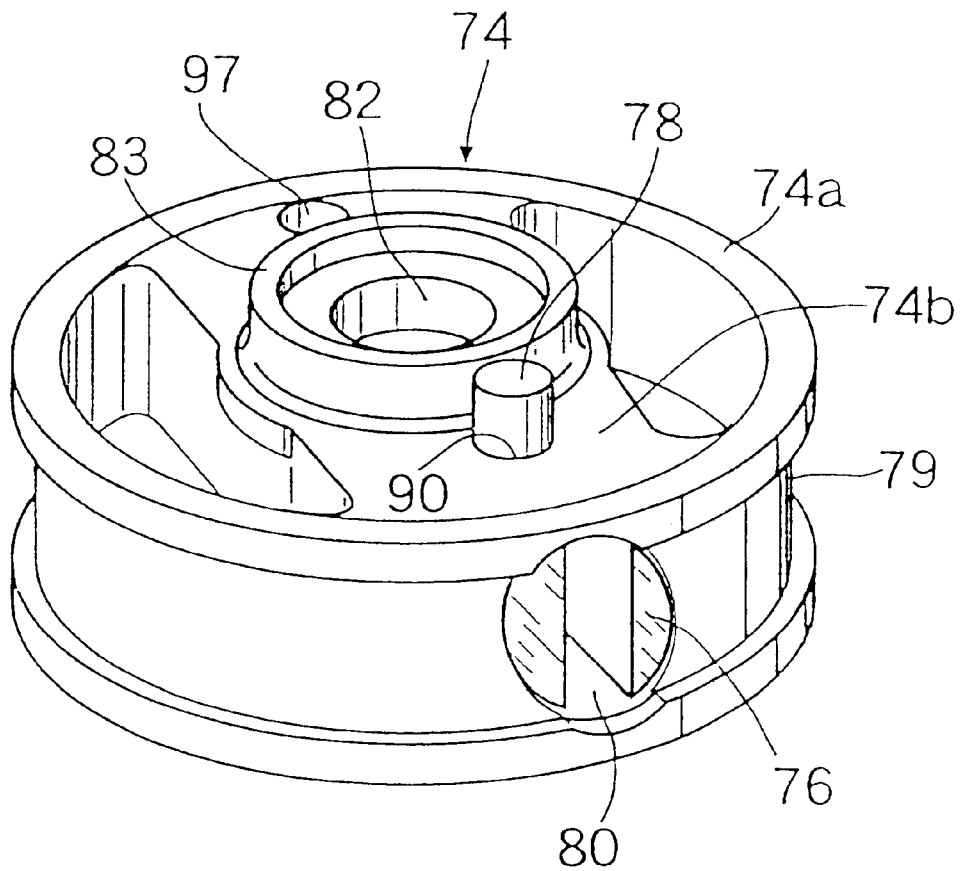
FIG. 8 is a perspective view seen from above a pin holder.
Figure 9:
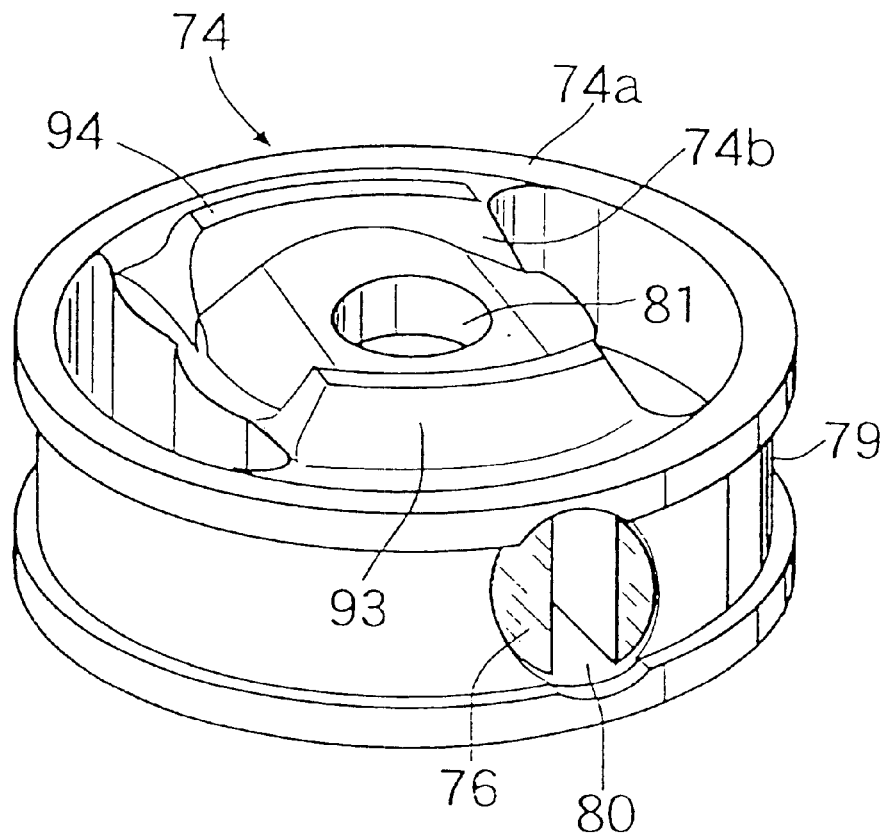
FIG. 9 is a perspective view seen from below the pin holder.

Referring additionally to FIGS. 8 and 9, the pin holder 74 includes a ring portion 74a slidably fitted in the valve lifter $71_1$ and a bridging portion 74b, integrated with the ring portion 74a, for connecting the opposed inner peripheral portions of the ring portion 74a along one diameter line of the ring portion 74a. The inner periphery of the ring portion 74a and both the side surface portions of the bridging portion 74b are partially cut off to reduce the weight. The pin holder 74 is made from a steel or an aluminum alloy by lost-wax casting or forging, or made from a synthetic resin. The outer peripheral surface of the metal made pin holder 74, that is, the outer peripheral surface of the metal made ring portion 74a and the inner peripheral surface of the valve lifter 71, are subjected to carbonization.

An annular groove 79 is formed in the outer peripheral portion of the pin holder 74, that is, the outer peripheral portion of the ring portion 74a. A bottomed sliding hole 80 is provided in the bridging portion 74b of the pin holder 74. The sliding hole 80 has an axial line along one diameter line of the ring portion 74a, that is, an axial line perpendicular to the axial line of the valve lifter $71_1$. One end of the sliding hole 80 is opened to the annular groove 79 and the other end thereof is closed. An insertion hole 81 for allowing the leading end of the valve stem 59 of the first intake valve $56_1$ to pass therethrough is formed at the center of a lower portion of the bridging portion 74b in such a manner as to be opened to the sliding hole 80. An extension hole 82 for containing the leading end of the valve stem 59 of the first intake valve $56_1$ is provided at the center of an upper portion of the bridging portion 74b in such a manner as to be coaxial with the insertion hole 81 with the sliding hole 80 put between the insertion hole 81 and the extension hole 82.

A containing cylinder portion 83 coaxial with the axial line of the extension hole 82 is integrally formed on a portion, facing to the closed end of the valve lifter $71_1$ of the bridging portion 74b of the pin holder 74. A disk-like shim 84 for blocking the end of the extension hole 82 on the closed side of the valve lifter $71_1$ is partially fitted in the containing cylinder portion 83. A projecting portion 85 to be in contact with the shim 84 is integrally formed at a central portion on the inner surface of the closed end of the valve lifter $71_1$.

The slide pin 76 is slidably fitted in the sliding hole 80 of the pin holder 74. If the pin holder 74 is made from a synthetic resin, only the slide-contact portion of the pin holder 74 with the slide pin 76 may be made from a metal.

The hydraulic chamber 75 communicated to the annular groove 79 is formed between one end of the slide pin 76 and the inner surface of the valve lifter $71_1$. The return spring 77 is contained in a spring chamber 86 formed between the other end of the slide pin 76 and the closed end of the sliding hole 80.

Figure 10:
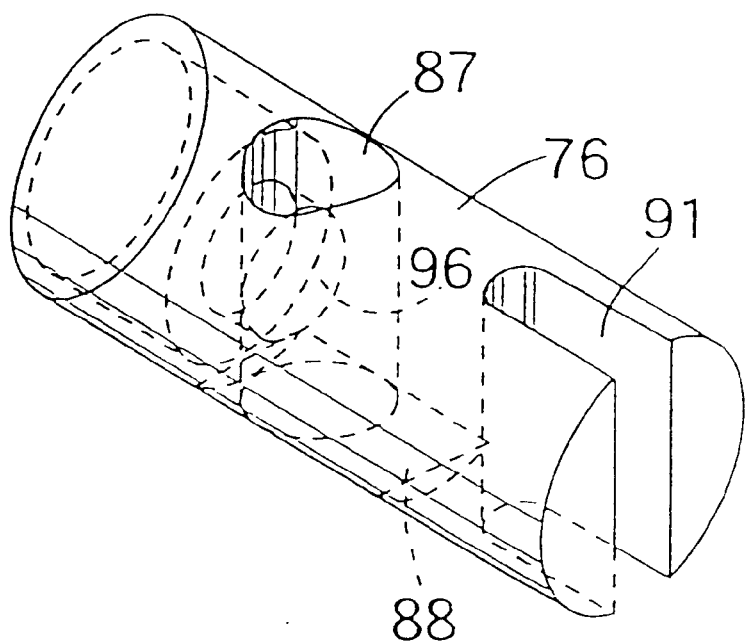
FIG. 10 is a perspective view of a slide pin.

Referring additionally to FIG. 10, a containing hole 87, which can be coaxially communicated to the insertion hole 81 and the extension hole 82 and also can contain the leading end of the valve stem 59, is provided at the intermediate portion in the axial direction of the slide pin 76. The end of the containing hole 87 on the insertion hole 81 side is opened to a flat contact plane 88 formed on the outer surface of the lower portion of the slide pin 76 in such a manner as to face to the insertion hole 82. To be more specific, the contact plane 88 is relatively longer along the axial line direction of the slide pin 76, and the containing hole 87 is opened in the contact plane 88 at a position offset to the spring chamber 86 side.

Such a slide pin 76 is slid in the axial direction in such a manner that hydraulic pressure of the hydraulic chamber 75 acting to one end of the slide pin 76 is balanced against a spring force of the return spring 77 acting to the other end side of the slide pin 76. In the non-acting state in which the hydraulic pressure of the hydraulic chamber 75 is low, the slide pin 76 is moved to the right in FIG. 7 for containing the leading end of the valve stem 59 inserted in the insertion hole 81 in the containing hole 87 and the extension hole 82. In the acting state in which the hydraulic pressure of the hydraulic chamber 75 is high, the slide pin 76 is moved leftward in FIG. 7 for offsetting the containing hole 87 from the axial lines of the insertion hole 81 and the extension hole 82 thereby bringing the leading end of the valve stem 59 into contact with the contact plane 88.

When the slide pin 76 is moved to the position at which the containing hole 87 is coaxial with the insertion hole 81 and the extension hole 82, the first intake valve 56, remains at rest. To be more specific, at this time, the pin holder 74 and the slide pin 76 are moved on the first intake valve $56_1$ side along with the sliding motion of the valve lifter $71_1$ by the pressing force acting from the first intake side valve system cam $69_1$. However, only the leading end of the valve stem 59 is contained in the containing hole 87 and the extension hole 82, and the pressing force is not applied from the valve lifter $71_1$ and the pin holder 74 to the first intake valve $56_1$ in the valve opening direction. When the slide pin 76 is moved to the position at which the leading end of the valve stem 59 is in contact with the contact plane 88, the first intake valve $56_1$ is operated to be opened/closed. To be more specific, at this time, the pin holder 74 and the slide pin 76 are moved toward the first intake valve $56_1$ side along with the sliding motion of the valve lifter $71_1$ by the pressing force acting from the first intake side valve system cam $69_1$, so that the pressing force is applied to the first intake valve $56_1$ in the valve opening direction. In this way, the first intake valve $56_1$ is operated to be opened/closed in accordance with the rotation of the first intake side valve system cam $69_1$.

If the slide pin 76 is rotated around its axial line in the pin holder 74, the axial line of the containing hole 87 is offset from those of the insertion hole 81 and the extension hole 82 so that the leading end of the valve stem 59 cannot be brought into contact with the contact plane 88. To cope with such an inconvenience, the stopper pin 78 is provided for stopping the rotation of the slide pin 76 around its axial line.

The stopper pin 78 is mounted in mounting holes 89 and 90 which are coaxially provided in the bridging portion 74b of the pin holder 74 in such a manner as to put part of the sliding hole 80 on its one end side therebetween. The stopper pin 78 passes through a slit 91 which is provided on the one end side of the slide pin 76 in such a manner as to be opened to the hydraulic chamber 75 side. To be more specific, the stopper pin 78 is mounted in the pin holder 74 in a state in which it passes through the slide pin 76 while permitting the axial movement of the slide pin 76. Accordingly, the stopper pin 78 is brought into contact with the inner closed end of the slit 91, so that the movement end of the slide pin 76 toward the hydraulic chamber 75 side is restricted.

A coil spring 92 is provided for biasing the pin holder 74 on the side on which the shim 84 mounted on the pin holder 74 is in contact with the projecting portion 85 provided at the central portion on the inner surface of the closed end of the valve lifter $71_1$. To be more specific, the coil spring 92 is disposed between the pin holder 74 and the cylinder head 40 in such a manner as to surround the valve stem 59 at a position where the outer periphery of the coil spring 92 is not brought into contact with the inner surface of the valve lifter $71_1$. A pair of projections 93 and 94 are integrally provided on the bridging portion 74b of the pin holder 74. The projections 93 and 94 function to position the end of the coil spring 92 in the direction perpendicular to the axial line of the valve stem 59.

Each of the projections 93 and 94, formed into a circular-arc centered at the axial line of the valve stem 59, projects from the pin holder 74 by an amount less than the diameter of the coil spring 92.

The projection 93 has a stepped portion 95 which is brought into contact with the end portion, on the first intake valve $56_1$ side, of the stopper pin 78, thereby preventing the movement of the stopper pin 78 on the first intake valve $56_1$ side.

To prevent a change in pressure in the spring chamber 86 by the axial movement of the slide pin 76, the slide pin 76 has a communication hole 96 through which the spring chamber 86 is communicated to the containing hole 87. Meanwhile, to prevent a change in pressure of a space between the pin holder 74 and the valve lifter $71_1$ due to temperature change, the pin holder 74 has a communication hole 97 through which the space is communicated to the spring chamber 86.

The cylinder head 40 has a supporting hole 98 for slidably supporting the valve lifter $71_1$ and an annular recess 99 is provided in the supporting hole 98 in such a manner as to surround the valve lifter $71_1$. The valve lifter $71_1$ has a communication hole 100 through which the annular recess 99 is communicated to the annular groove 79 formed in the pin holder 74 irrespective of the sliding motion of the valve lifter $71_1$ in the supporting hole 98, and also has a release hole 101. The release hole 101 is provided in the valve lifter $71_1$ at such a position as to allow, when the valve lifter $71_1$ is moved at the uppermost position in FIG. 7, communication between the annular recess 99 to the inside of the valve lifter $71_1$ through the lower portion of the release hole 101 positioned under the pin holder 74 but to block, as the valve lifter $71_1$ is moved downwardly from the uppermost position in FIG. 7, the communication between the annular recess 88 and the inside of the valve lifter $71_1$. Lubricating oil is jetted in the valve lifter $71_1$ through the release hole 101.

The cylinder head 40 also has working oil feed passages 103 communicated to the annular recesses 99 of the combustion chambers 43.

An exhaust side valve system 68E for driving the first and second exhaust valves $57_1$ and $57_2$ of the combustion chambers 43 includes a cam shaft 106, bottomed cylindrical valve lifters $107_1$ and bottomed cylindrical valve lifters $107_2$. The cam shaft 106 has first exhaust side valve system cams $105_1$ corresponding to the first exhaust valves $57_1$ and the second exhaust side valve system cams $105_2$ corresponding to the second exhaust valves $57_2$. The valve lifters 107, are supported by the cylinder head 40 in such a manner as to be slidably driven by the first exhaust side valve system cams $105_1$. The valve lifters $107_2$ are supported by the cylinder head 40 in such a manner as to be slidably driven by the second exhaust side valve system cams $105_2$.

The cam shaft 106 has an axial line perpendicular to the extensions of the axial lines of the valve stems 61 of the first and second exhaust valves $57_1$ and $57_2$ and is rotatably supported between the cylinder head 40 and the holder 55 connected to the cylinder head 40 like the cam shaft 70 of the intake side valve system 68I. The valve lifters $107_1$ are slidably fitted in the cylinder head 40 in such a manner as to be slidably movable in the same axial direction as the axial lines of the valve stems 61 of the first exhaust valves $57_1$. The outer surface of the closed end of each valve lifter $107_1$ is in slide-contact with the associated one of the first exhaust side valve system cams $105_1$. The valve lifters $107_2$ are slidably fitted in the cylinder head 40 in such a manner as to be slidably movable in the same axial direction as the axial lines of the valve stems 61 of the second exhaust valves $57_2$. The outer surface of the closed end of each valve lifter $107_2$ is in slide-contact with the associated one of the second exhaust side valve system cams $105_2$.

The leading end of the valve stem 61 of the second exhaust valve $57_2$ is in contact with the inner surface of the closed end of the valve lifter $107_2$ via a shim 108. The second exhaust valve $57_2$ is, during operation of the engine E, usually operated to be opened/closed by the second exhaust side valve system cam $105_2$. On the other hand, a valve resting mechanism 73E is provided between the valve stem 61 of the first exhaust valve $57_1$ and the valve lifter $107_1$. The valve resting mechanism 73E can switch an acting state and a non-acting state of a pressing force applied from the valve lifter $107_1$ to the first exhaust valve $57_1$ in the valve opening direction. To be more specific, in a specific operational region, typically, a low speed operational region of the engine E, the valve resting mechanism 73E creates the non-acting state of the pressing force, thereby turning the first exhaust valve $57_1$ into the resting state irrespective of the sliding motion of the valve lifter $107_1$. The valve resting mechanism 73E has the same configuration as that of the valve resting mechanism 73I of the intake side valve system 68I.

Figure 11:
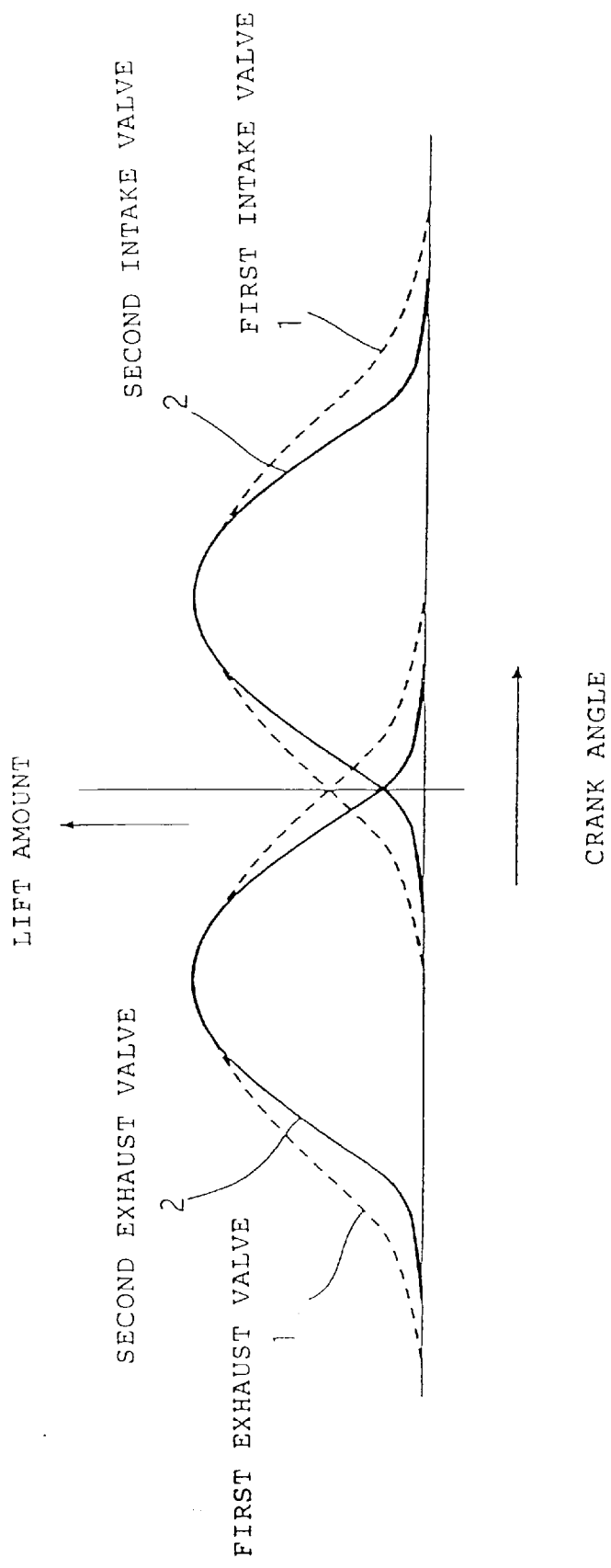
FIG. 11 is a characteristic diagram showing the valve opening lift amounts of intake valves and exhaust valves.

In the non-acting state of the valve resting mechanism 73I and 73E, that is, in the state in which the first intake valve $56_1$ and the first exhaust valve $57_1$ are operated to be opened/closed, as shown by broken curves in FIG. 11, the first intake side valve system cam $69_1$ and the first exhaust side valve system can $105_1$ are operated in such a manner that the total opening angle is made relatively large and the angle at which the opening state of the first intake valve $56_1$ is overlapped to that of the first exhaust valve $57_1$ is made relatively large. However, as shown by solid curves in FIG. 11, the second intake side valve system cam $69_2$ and the second exhaust side valve system cam $105_2$ are operated in such a manner that the total opening angle is made relatively small and the angle at which the opening state of the second intake valve $56_2$ is overlapped to that of the second exhaust valve $57_2$ is made relatively small.

In accordance with such intake side and exhaust side valve systems 68I and is 68E, in a low speed operational region as a specific operational region of the engine E, the first intake valve $56_1$ and the first exhaust valve $57_1$ are rested and only the second intake valve $56_2$ and the second exhaust valve $57_2$ are operated to be opened/closed. At this time, since the angle at which the opening state of the second intake valve $56_2$ is overlapped to that of the second exhaust valve $57_2$ is relatively small, the rear compression ratio in the combustion chamber 43 can be improved, and since swirl occurs by flow-in of the fuel-air mixture in the combustion chamber 43 only through the second intake passage $46_2$ the fuel consumption can be reduced and the output torque is increased. In a high speed operational region, since the valve resting mechanisms 73I and 73E are turned into the acting state, not only the second intake valves $56_2$ and the second exhaust valves $57_2$ are usually operated to be opened/closed but also the first intake valve $56_1$ and the first exhaust valve $57_1$ are operated to be opened/closed, with a result that the output in the high speed operational region can be enhanced. Accordingly, in a wide operational region from a low speed operational region to a high speed operational region, it is possible to enhance the output and to reduce the fuel consumption.

As described above, in a low speed operational region of the engine E, the first intake valve 56, is rested, and in such a state, fuel remains in the intake passage corresponding to the intake valve $56_1$, that is, the first intake passage $46_1$. When the operation for the low speed operational region is switched to the operation for a high speed operational region in which the intake valves $56_1$ and $56_2$ are operated to be opened/closed, the fuel thus remaining in the first intake passage $46_1$ flows in the combustion chamber 43, and thereby the concentration of the fuel in the combustion chamber 43 becomes temporarily dense. This may reduce the output of the engine E and cause an occurrence of unburned hydrocarbon.

To cope with such an inconvenience, as shown in FIG. 6, a communication passage 109, which communicates the second intake passage $46_2$ corresponding to the second intake valve $56_2$ usually opened/closed upon operation of the engine E to the first intake passage $46_1$ corresponding to the first intake valve $56_1$ rested in a specific operation region upon the operation of the engine E, is formed in the cylinder head 40. In the resting state of the first intake valve $56_1$ the fuel-air mixture in the first intake passage $46_1$ flows in the second intake passage $46_2$ through the communication passage 109 as shown by an arrow 110 in FIG. 6.

The communication passage 109 is formed in the cylinder head 40 obtained by casting, by cutting from the combustion chamber 43 side, in such a manner as to be tilted toward the combustion chamber 43 in the direction from the second intake passage $46_2$ to the first intake passage $46_1$. The opening end of the communication passage 109 for communicating the first intake passage $46_1$ to the second intake passage $46_2$ is disposed at a position being as close to the combustion chamber 43 as possible.

Referring to FIG. 5, a containing hole 112 is provided in the cylinder head 40 at a position between the adjacent two, on the central side along the arrangement direction, of the four cylinder bores 37. The cylinder head 40 is partitioned by the containing hole 112 into first and second head portions $4_1$ and $40_2$.

A means such as a chain drive means for driving the cam shafts 70 and 106 of the intake side and exhaust side valve systems 68I and 68E is contained in the containing hole 112.

Figure 12:
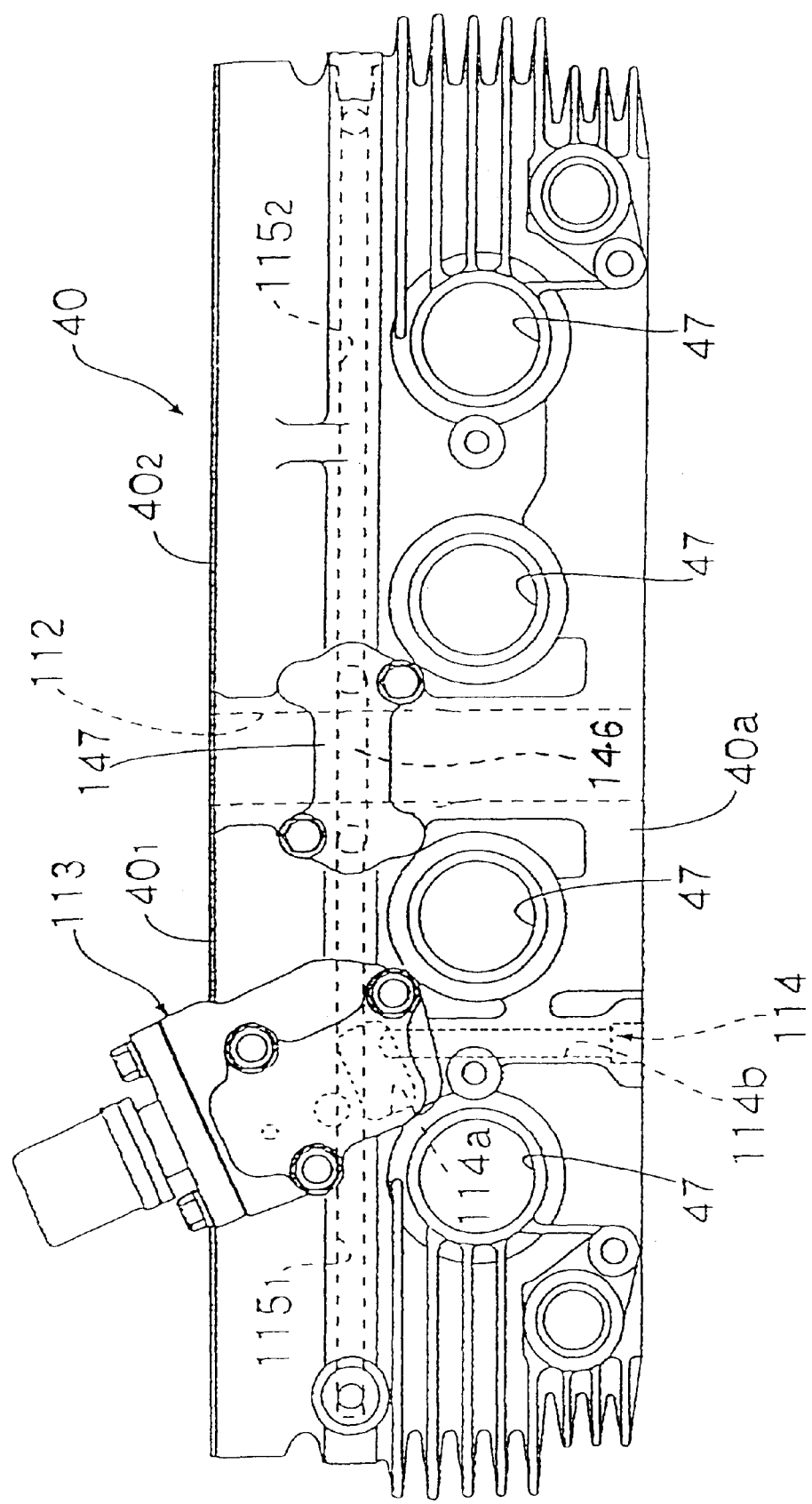
FIG. 12 is a side view, seen from an arrow 12 of FIG. 5, of the cylinder head.

Referring additionally to FIG. 12, a hydraulic control valve 113 is mounted on the one side surface 40a of the cylinder head 40 to which the intake ports 47 are opened at a position between a pair of the intake ports 47 disposed on the first head $40_1$ side. The hydraulic control valve 113 is used for controlling a hydraulic pressure of working oil fed to the valve resting mechanism 43I and 43E of the intake side and exhaust side valve systems 68I and 68E.

Figure 13:
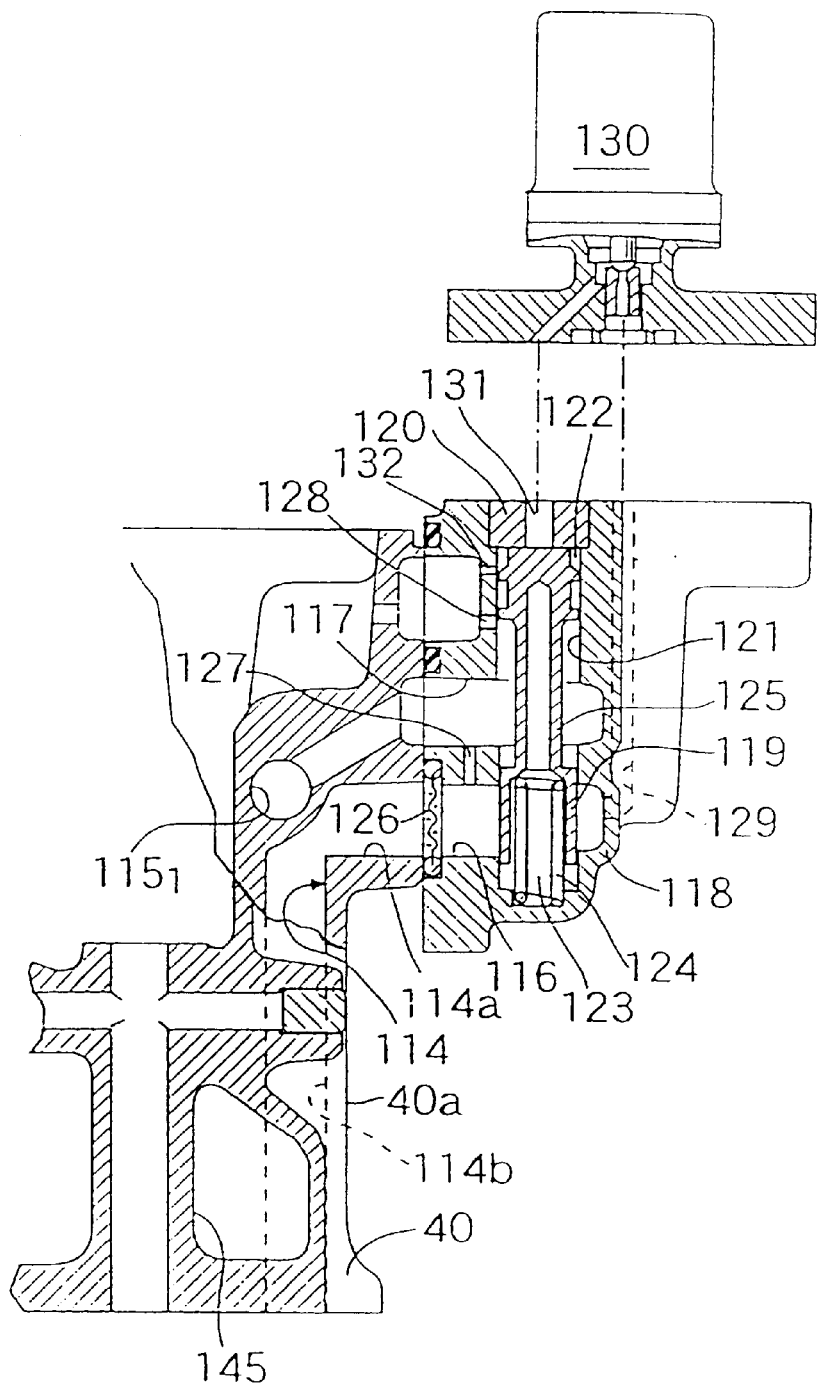
FIG. 13 is a sectional view showing a configuration of a hydraulic control valve.

Referring to FIGS. 12 and 13, the hydraulic control valve 113 is mounted on the one side surface 40a of the cylinder head 40 for switching the on/off of the communication between the opening end of a working oil intake passage 114 to the one side surface 40a of the cylinder head 40 and the opening end of a first working oil discharge passage 115, to the one side surface 40a of the cylinder head 40. The hydraulic control valve 113 includes an inlet 116 communicated to the working oil intake passage 114, an outlet 117 communicated to the first working oil discharge passage $115_1$ and a spool valve body 119 slidably fitted in a housing 118 mounted on the side surface 40a of the cylinder head 40.

The housing 118 has a cylinder hole 121 with its upper end blocked by a cap 120. The spool valve body 119 is slidably fitted in the cylinder hole 121 in such a manner as to form a hydraulic chamber 122 between the cap 120 and the spool valve body 119. A spring chamber 123 is formed between the lower portion of the housing 118 and the spool valve body 119. A spring 124 for biasing the spool valve body 119 upwardly, that is, in the closing direction is contained in the spring chamber 123. The spool valve body 119 has an annular recess 125 for allowing communication between the inlet 116 and the outlet 117. When the spool valve body 119 is moved upwardly as shown in FIG. 13, it blocks the communication between the inlet 116 and the outlet 117.

In a state in which the housing 118 is mounted on the one side surface 40a of the cylinder head 40, an oil filter 126 is held between the inlet 116 and the working oil intake passage 114. The housing 118 also has an orifice hole 127 for communicating the inlet 116 to the outlet 117. Accordingly, even in a state in which the spool valve body 119 is located at the closing position, the inlet 116 is communicated to the outlet 117 through the orifice hole 127, so that a hydraulic pressure restricted by the orifice hole 127 is fed from the outlet 117 into the first working oil discharge passage $115_1$.

The housing 118 also has a bypass port 128 which is communicated to the outlet 117 through the annular recess 125 only in the state in which the spool valve body 119 is located at the closing position. The bypass port 128 is communicated to the upper inside portion of the cylinder head 40.

The housing 118 also has a passage 129 usually communicated to the inlet 116. The passage 129 is connected via a solenoid valve 130 to a connection hole 131 which is formed in the cap 120 in such a manner as to be communicated to the hydraulic chamber 122. When the solenoid valve 130 is opened, a hydraulic pressure is fed into the hydraulic chamber 122, and the spool valve body 119 is driven to be opened by the hydraulic pressure thus introduced into the hydraulic chamber 122.

The housing 118 also has a leak jet 132 communicated to the hydraulic chamber 122. The leak jet 132 is also communicated to the upper inside portion of the cylinder head 40. When the solenoid valve 130 is closed, the hydraulic pressure remaining in the hydraulic chamber 122 is released through the leak jet 132.

Figure 14:
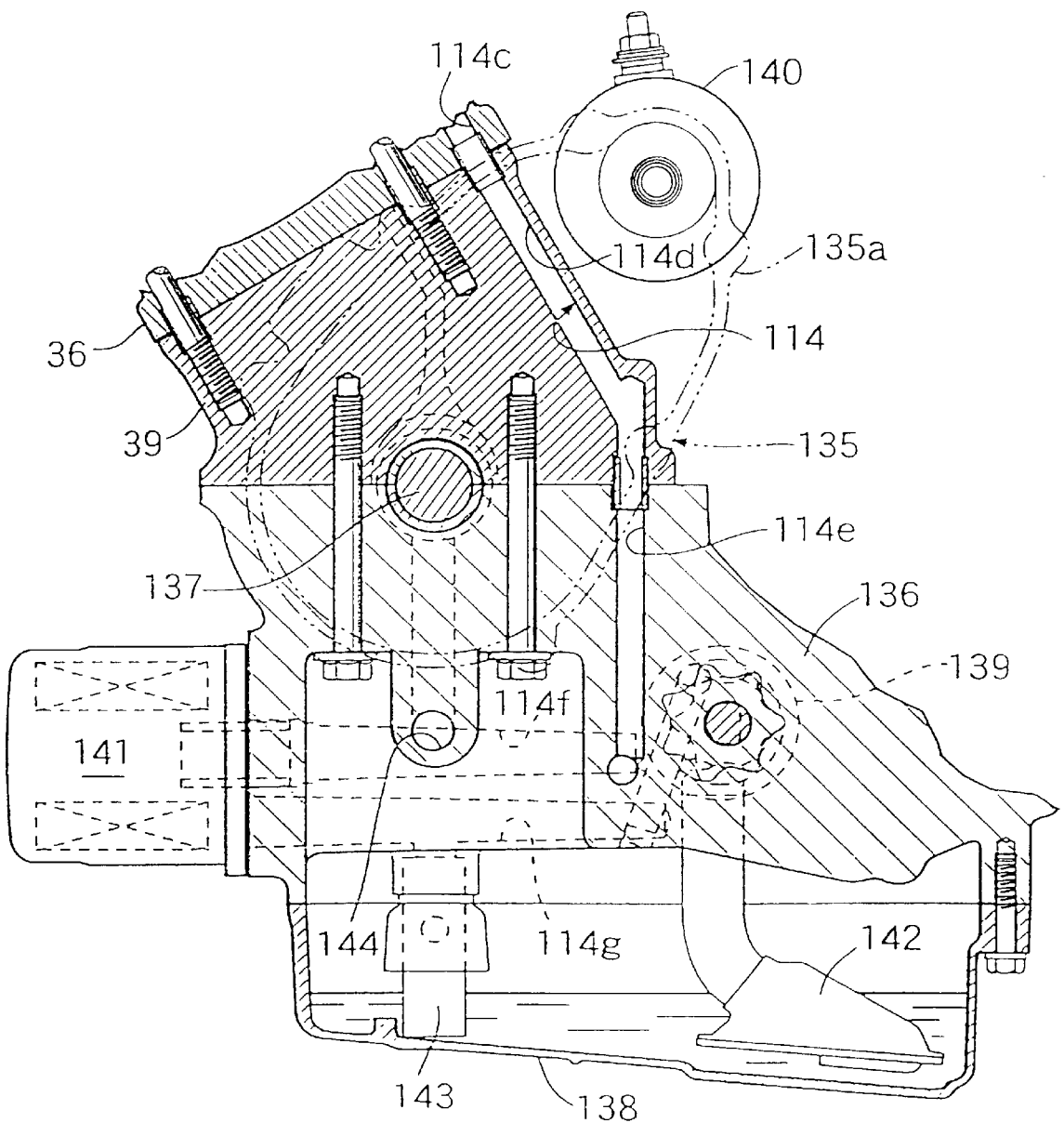
FIG. 14 is a vertical sectional view showing a hydraulic passage of the cylinder block and a crank case.

Referring to FIG. 14, a lower crank case 136 constituting part of a transmission case 135 is connected to a lower portion of the upper crank case 39. A crank shaft 137 is rotatably supported between both the crank cases 39 and 136.

An oil pan 138 is connected to a lower portion of the lower crank case 136. An oil pump 139 for pumping up working oil remaining in the oil pan 138 is contained in the transmission case 135. A projecting portion 135a, which projects upwardly from the upper crank case 39, is provided on the transmission case 135. A starter motor 140 having a rotational axial line parallel to the crank shaft 137 is mounted on the projecting portion 135a at a position over the upper crank case 39.

The working oil intake passage 114 for introducing working oil from the oil pump 135 to the hydraulic control valve 113 is provided in the cylinder head 40, the cylinder block 36, the upper crank case 39, and the lower crank case 136.

The working oil intake passage 114 includes a connection port 114a connected to the inlet 116 of the hydraulic control valve 113 and opened to the one side surface 40a of the cylinder head 40. A first passage 114b is provided in the cylinder head 40 in such a manner as to be connected to the connection port 114a and extends in a straight line along the one side surface 40a. A second passage 114c is provided in the cylinder block 36 in such a manner as to be coaxially connected to the first passage 114b. A third passage 114d is provided in the lower crank case 39 in such a manner as to be coaxially connected to the second passage 114c and to extend in a straight line. A fourth passage 114e is provided in the lower crank case 136 in such a manner as to be connected to the lower end of the third passage 114d and to extend in the vertical direction. A fifth passage 114f is provided in the lower crank case 136 in such a manner as to be connected to the lower end of the fourth passage 114e and to extend substantially in the horizontal direction. A sixth passage 114g is provided in the lower crank case 136 in such a manner as to extend substantially in parallel to the fifth passage 114f. A filter 141 interposed between the fifth and sixth passages 114f and 114g is mounted in the lower crank case 136, and the sixth passage 114g is connected to a discharge port of the oil pump 139.

A strainer 142 disposed in the oil pan 138 is connected to an intake port of the oil pump 139. Working oil sucked in the oil pump 139 via the strainer 142 is discharged in the working oil intake passage 141 in which the filter 141 is interposed. A relief valve 143 for preventing excess of the hydraulic pressure of the working oil is connected between the oil pump 139 and the filter 141. An oil gallery 144 for feeding oil to each portion of the engine E to be lubricated is communicated to an intermediate portion of the fifth passage 114f connected to the filter 141.

A water jacket 145 is provided in the cylinder block 36 and the cylinder head 40. The first passage 114b and the second passage 114c, corresponding to the cylinder block 36 and the cylinder head 40, of the working oil intake passage 114 are disposed outside the water jacket 145.

Referring to FIGS. 5 and 12, the first head portion $40_1$ of the cylinder head 40 has a first working oil discharge passage $115_1$ for feeding working oil to the valve resting mechanisms 73I and 73E for each of the combustion chambers 43 disposed on the first head portion $40_1$ side, and the second head portion $40_2$ has a second working oil discharge passage $115_2$ for feeding working oil to the valve resting mechanisms 73I and 73E for each of the combustion chambers 43 on the second head portion $40_2$ side. The working oil feed passages 103 provided in the cylinder head 40 for the valve resting mechanisms 73I and 73E (see FIG. 7) are branched from the first and second working oil discharge passages $115_1$ and $115_2$.

A mounting seat 146 is mounted on the one side surface 40a of the cylinder head 40 in such a manner as to cross between the first and second head portions $40_1$ and $40_2$. The first and second working oil discharge passages $115_1$ and $115_2$ are provided in the cylinder head 40 in such a manner that one end thereof is commonly opened to the mounting seat 146 and the other end thereof is closed at a position near the containing hole 112.

A cover 147 is fastened to the mounting seat 146, and the working oil discharge passage $115_1$ and $115_2$ are communicated to each other via the cover 147.

Next, the function of the first embodiment will be described. The communication passage 109 for communicating the second intake passage $46_2$ corresponding to the second intake valve $56_2$ opened/closed even in a specific operational region to the first intake passage $46_1$ corresponding to the first intake valve $56_1$ rested in the specific operational region is provided in the cylinder head 40. Accordingly, when the first intake valve $56_1$ is rested, a fuel-air mixture flows from the first intake passage $46_1$ corresponding to the rested first intake valve $56_1$ to the second intake passage $46_2$ corresponding to the opened/closed second intake valve $56_2$ via the communication passage 109, so that it is possible to prevent the fuel from remaining in the first intake passage $46_1$ in the resting state of the first intake valve $56_1$ as much as possible. As a result, when the operation for the above specific operational region is switched to the operation for an operational region in which the intake valves $56_1$ and $56_2$ are both opened/closed, it is possible to eliminate the inconvenience that the remaining fuel flows in the combustion chamber 43. This makes it possible to prevent the mixing ratio of the fuel-air mixture flows in the combustion chamber 43 from being made unstable, and hence to prevent the reduction in engine output and the occurrence of unburned hydrocarbon as much as possible.

Since the phenomenon in which the fuel remains in the first intake passage $46_1$ in the resting state of the first intake valve $56_1$ can be prevented as described above, even if the intake system 51 is simply configured to have the carburetor 50 common to the intake passages $46_1$ and $46_2$ it is possible to avoid the inconvenience that the mixing ratio of the fuel-air mixture flowing in the combustion chamber 43 is made unstable when the operation for the specific operational region in which the first intake valve $56_1$ that is in a rest position is switched to the operation for the operational region in which the intake valves $56_1$ and $56_2$ are both opened/closed.

The communication passage 109 can be simply formed in the cylinder head 40, having been obtained by casting, by cutting from the combustion chamber 43 side. Since the communication passage 109 is tilted toward the combustion chamber 43 in the direction from the second intake passage $46_2$ to the first intake passage $46_1$ the opening end of the communication passage 109 for communicating the first intake passage $46_1$ that is rested in a specific operational region to the second intake passage $46_2$ can be disposed at a position being as close to the combustion chamber 43 as possible. As a result, when the first intake valve $56_1$ is rested in the specific operational region, the first intake passage $46_2$ corresponding to the rested first intake valve $56_1$ can be communicated to the second intake passage $46_2$ at a position being as close to the combustion chamber 43 as possible, so that the remaining amount of fuel in the resting state of the first intake valve $56_1$ can be made as small as possible.

The hydraulic control valve 113 for controlling the hydraulic pressure of working oil to the hydraulic valve resting mechanism 73I and 73E for resting the first intake valve $56_1$ and the first exhaust valve $57_1$ in a specific operational region are mounted on the side surface 40a of the cylinder head 40 to which a plurality of the intake ports 47 provided in the cylinder head 40 are opened. To be more specific, the hydraulic control valve 113 is mounted on the side surface 40a of the cylinder head 40 in the direction perpendicular to the arrangement direction of the cylinder bores 37, that is, in the forward or rearward direction (in the rearward direction in this embodiment) of the body frame 21. As a result, it is possible to avoid an inconvenience that the length of the multi-cylinder engine E extending along the arrangement direction of the cylinder bores 37 becomes large due to the mounting of the hydraulic control valve 113 to the cylinder head 40. That is to say, in the motorcycle in which the engine E is mounted on the body frame 21 with the arrangement direction of the cylinder bores 37 set in the width direction of the body frame 21, the length of the multi-cylinder engine E extending along the width direction of the body frame 21 can be made as small as possible.

Since the hydraulic control valve 113 is mounted on the side surface 40a of the cylinder head 40 to which the intake ports 47 are opened, it is possible to prevent adverse effect of exhaust heat of the engine E from being exerted on the hydraulic control valve 113.

Since the hydraulic control valve 113 is mounted on the side surface 40a of the cylinder head 40 at a position between the adjacent two of the intake ports 47 by making effective use of a space therebetween, it is possible to decrease the length of the multi-cylinder engine E along the width direction of the body frame 21.

Since the working oil intake passage 114 for introducing working oil from the oil pump 139 to the hydraulic control valve 113 is provided in the cylinder head 40, the cylinder block 36, and the crank cases 39 and 136, it is possible to eliminate the necessity of the provision of an additional pipe line for introducing the working oil from the oil pump 139 to the hydraulic control valve 113, and hence to simplify the appearance of the multi-cylinder engine E.

Since the water jacket 145 is provided in the cylinder block 36 and the cylinder head 40 and the two parts, corresponding to the cylinder block 36 and the cylinder head 40, of the working oil intake passage 114 are disposed outside the water jacket 145, it is possible to effectively cool the working oil flowing in the working oil intake passage 114.

The working oil intake passage 114 has at least the first passage 114b provided in the cylinder head 40 in such a manner as to extend in a straight line along the side surface 40a between the one side surface 40a of the cylinder head 40 and the water jacket 145. A second passage 114c is provided in the cylinder block 36 in such a manner as to be coaxial with the first passage 114b. A third passage 114d is provided in the upper crank case 39 in such a manner as to be coaxial with the second passage 114c and extend in a straight line therefrom. As a result, it is possible to make the working oil passage from the oil pump 139 to the hydraulic control valve 113 as short as possible, and hence to make a loss in hydraulic pressure in the working oil intake passage 114 as small as possible.

The containing hole 112, which contains the means for driving the cam shafts 70 and 106, is provided in the cylinder head 40 at a position between the adjacent two, on the central side along the arrangement direction, of the four cylinder bores 37. The cylinder head 40 is partitioned by the containing hole 112 into the first and second head portions $40_1$ and $40_2$. As a result, it is possible to desirably keep the balance between the cylinder heads 40 along the arrangement direction of the cylinder bores 37, and thereby the balance of the multi-cylinder engine E as a whole.

The first working oil discharge passage $115_1$ for supplying working oil to the valve resting mechanism 73I and 73E for each of the combustion chambers 43 on the first head portion $40_1$ side is provided in the first head portion $40_1$ in such a manner as to be connected to the hydraulic control valve 113 mounted on the side surface 40a of the cylinder head 40 between a pair of the intake ports 47 disposed on the first head portion $40_1$ side. The second working oil discharge passage $115_2$ is provided for supplying working oil to the valve resting mechanism 73I and 73E for each of the combustion chambers 43 on the second head portion $40_2$ side is provided in the second head portion $40_2$. The one-ends of the first and second working oil discharge passages $115_1$ and $115_2$ are opened to the mounting seat 146 which is formed on the side surface 40a of the cylinder head 40 in such a manner as to cross between the first and second head portions $40_1$ and $40_2$. The first and second working oil discharge passages $115_1$ and $115_2$ are communicated to each other via the cover 147 fastened to the mounting seat 146.

Accordingly, the first and second working oil discharge passages $115_1$ and $115_2$ provided in the cylinder head 40 on both of the sides of the containing hole 112 can be simply communicated to each other, and thereby working oil discharged from the single hydraulic control valve 113 can be effectively supplied to the valve resting mechanism 73I and 73E for each of the combustion chambers 43.

In the valve resting mechanism 73I (or 73E), the pin holder 74 is slidably fitted in the valve lifter $71_1$ (or $107_1$) driven by the valve system cam $59_1$ (or $105_1$). The slide pin 76 slidably fitted in the pin holder 74 is slidable between the position at which the leading end of the valve stem 59 (or 61) is contained in the containing hole 87 and the position at which the leading end of the valve stem 59 (or 61) is in contact with the contact plane 88 as the outer side surface of the slide pin 76 in accordance with the balance between the hydraulic force and the spring force applied to both the ends of the slide pin 76. As a result, by controlling the hydraulic force applied to one end of the slide pin 76, it is possible to switch the resting state and the opening/closing state of the first intake valve $56_1$ (or the first exhaust valve $57_1$) from each other.

Since the rotation of the slide pin 76 around its axial line in the pin holder 74 is prevented only by the simple configuration in which the stopper pin 78 is mounted in the pin holder 74, the valve resting mechanism 73I (or 73E) can be easily assembled with the stem 59 (or 61) of the first intake valve $56_1$ (or the first exhaust valve $57_1$) by mounting the valve lifter $71_1$ (or $107_1$) to the cylinder head 40 in the state that the pin holder 74 in which the slide pin 76 has been fitted is fitted in the valve lifter $71_1$ (or $107_1$).

The pin holder 74 has the insertion hole 81 into which the leading end of the stem 59 (or 61) of the first intake valve $56_1$ (or the first exhaust valve $57_1$) can be inserted, and also has the extension hole 82, disposed coaxially with the insertion hole 81, for containing the leading end of the valve stem 59 (or 61). The sliding hole 80 in which the slide pin 76 is slidably fitted is put between the insertion hole 81 and the extension hole 82. Accordingly, since in the resting state of the first intake valve $56_1$ (or the first exhaust valve $57_1$), the leading end of the valve stem 59 (or 61) is contained not only in the containing hole 87 but also in the extension hole 82, the length of the containing hole 87, that is, the diameter of the slide pin 76 can be made small. This makes it possible to miniaturize the pin holder 74 and hence to the miniaturize the entire valve resting mechanism 73I (or 73E).

The shim 84 for blocking the end portion of the extension hole 82 on the closed end side of the valve lifter $71_1$ (or $107_1$) is mounted on the pin holder 74 in such a manner that it can be brought into contact with the closed end of the valve lifter $71_1$ ($107_1$). To be more specific, it is required to block the end portion of the extension hole on the closed end side of the valve lifter for applying a pressing force from the valve lifter $71_1$ (or $107_1$) to the pin holder 74, and in this embodiment, the end portion of the extension hole 82 is blocked with the shim 84 which is brought into contact with the closed end of the valve lifter $71_1$ (or $107_1$). Accordingly, it is possible to simplify the structure of the pin holder 74, and to suitably adjust a gap at the valve head of the first intake valve $56_1$ (or first exhaust valve $57_1$) by changing the thickness of the shim 84.

The containing cylinder portion 83 coaxial with the axial line of the extension hole 82 is integrally formed on the pin holder 74 at a position facing to the closed end of the valve lifter $71_1$ (or $107_1$), and the disk-like shim 84 is partially fitted in the containing cylinder portion 83. As a result, it is possible to simply mount the relatively small shim 84 on the pin holder 74.

The projecting portion 85 to be in contact with the shim 84 is integrally formed on the inner surface of the closed end of the valve lifter $71_1$ (or $107_1$), and accordingly, the sliding motion of the valve lifter $71_1$ (or $107_1$) with respect to the cylinder head 40 can be certainly performed along the axial line of the valve stem 59 (or 61) in such a manner that the pressing force is applied from the valve lifter $71_1$ (or $107_1$) to the pin holder 74 on the extension of the axial line of the valve stem 59 (or 61) of the first intake valve $56_1$ (or the first exhaust valve $57_1$). As a result, the sliding motion of the valve lifter $71_1$ (or $107_1$) can be smoothened.

The coil spring 92 for biasing the pin holder 74 toward the closed end side of the valve lifter $71_1$ (or $107_1$) is provided between the pin holder 74 and the cylinder head 40. To be more specific, the coil spring 92 is disposed in such a manner as to surround the valve stem 59 (or 61) at a position at which the outer periphery of the coil spring 92 is not in contact with the inner surface of the valve lifter $71_1$ (or $107_1$). The projections 93 and 94 for positioning the end portion of the coil spring 92 in the direction perpendicular to the axial line of the valve stem 59 (or 61) are provided on the pin holder 74. As a result, it is possible to allow the spring force of the coil spring 92 to be certainly applied along the axial line of the valve stem 59 (or 61), and to prevent the occurrence of frictional loss due to slide-contact of the outer periphery of the coil spring 92 with the valve lifter $71_1$ (or $107_1$).

Since the projecting amount of each of the projections 93 and 94 is less than the diameter of the coil spring 92, even if the coil spring 92 is contracted, it is not in slide-contact with the pin holder 74. As a result, it is possible to prevent the occurrence of the frictional loss due to the slide-contact of the coil spring 92 with the pin holder 74.

While the embodiments of the present invention have been described in detail, the present invention is not limited thereto, and it is to be understood that many changes in design may be made without departing from the scope of the claims.

For example, in the above embodiment, description has been made of the multi-cylinder engine E in which a pair of the intake valves $56_1$ and $56_2$ and a pair of the exhaust valves $57_1$ and $57_2$ are provided in the cylinder head 40 for each of the combustion chambers 43. However, the present invention can be widely applied to a multi-cylinder engine in which at least a plurality of intake valves or exhaust valves are provided for each of combustion chambers 43 and at least one of the plurality of the intake valves or exhaust valves is rested in a specific operational region.

As described above, according to the present invention, it is possible to avoid an inconvenience wherein the length of the multi-cylinder engine along the arrangement direction of the cylinder bores becomes large due to the mounting of the hydraulic control valve on the cylinder head, and hence to make the length of the multi-cylinder engine along the width direction of the body frame as short as possible and prevent adverse effect of exhaust heat of the engine from being exerted on the hydraulic control valve.

According to the present invention, it is possible to dispose the hydraulic control valve by making effective use of a space between the adjacent two of the intake is ports and hence to make shorter the length of the multi-cylinder engine along the width direction of the body frame.

According to the present invention, it is possible to eliminate the necessity of the provision of an additional pipe line for introducing working oil from an oil pump to the hydraulic control valve and hence to simplify the appearance of the multi-cylinder engine.

According to the present invention, it is possible to effectively cool working oil flowing in the working oil intake passage.

According to the present invention, it is possible to make the working oil route from the oil pump to the hydraulic control valve as short as possible and hence to make a loss in hydraulic pressure in the working oil intake passage as small as possible.

According to the present invention, it is possible to keep the desirable balance of the cylinder head along arrangement direction of the cylinder bores, and thereby the desirable balance of the multi-cylinder engine as a whole although the containing hole for containing the means for driving the cam shafts is provided in the cylinder head, and also it is possible to simply communicate the first and second working oil discharge passages provided in the cylinder head on both sides of the containing hole and hence to effectively supply working oil discharged from the single hydraulic control valve to the valve resting mechanism for each of the combustion chambers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-cylinder engine for a motorcycle, comprising:
   a cylinder block having a plurality of cylinder bores arranged in the width direction of a body frame;
   a cylinder head connected to said cylinder block with combustion chambers formed between pistons slidably fitted in said cylinder bores and said cylinder head;
   a hydraulic valve resting mechanism capable of resting, in a specific operational region, at least one of a plurality of kinds of engine valves provided in said cylinder head for each of said combustion chambers; and
   a hydraulic control valve, mounted on said cylinder head, for controlling the hydraulic pressure of working oil supplied to said valve resting mechanism;
   wherein said hydraulic control valve is mounted on a side surface of said cylinder head to which a plurality of intake ports individually corresponding to said combustion chambers are opened along the longitudinal direction of said body frame said hydraulic control valve being mounted on said side surface of said cylinder head at a position between two adjacent intake ports.

2. The multi-cylinder engine for a motorcycle according to claim 1, wherein a cylinder bole for containing valve means is provided in said cylinder head at a position between two adjacent intake ports, on the central side along the arrangement direction of said cylinder bores of an even number of four or more for partitioning said cylinder head into first and second head portions located on both sides of said cylinder hole, a first working oil discharge passage for supplying working oil to said valve resting mechanism for each of said combustion chambers on said first head portion side is provided in said first head portion, said passage being connected to said hydraulic control valve mounted on said side surface of said cylinder head at a position between a pair of said intake ports of a plurality of said intake ports arranged on said first head portion side;
   a second working oil discharge passage for supplying working oil to said valve resting mechanism for each of said combustion chambers on said second head portion side is provided in said second head portion;

one end of said first and second working oil discharge passages is opened to a mounting seat formed on said side surface of said cylinder head for crossing between said first and second head portions; and said first and second working oil discharge passages are communicated to each other via a cover fastened to said mounting seat.

3. The multi-cylinder engine for a motorcycle according to claim 1, wherein a working oil intake passage for introducing working oil from an oil pump to said hydraulic control valve is provided in said cylinder head, said cylinder block, and a crank case.

4. The multi-cylinder engine for a motorcycle according to claim 1, wherein a working oil intake passage for introducing working oil from an oil pump to said hydraulic control valve is provided in said cylinder head, said cylinder block, and a crank case.

5. The multi-cylinder engine for a motorcycle according to claim 3, wherein a water jacket is provided in said cylinder block and said cylinder head and two parts, corresponding to said cylinder block and said cylinder head of said working oil intake passage are disposed outside said water jacket.

6. The multi-cylinder engine for a motorcycle according to claim 4, wherein a water jacket is provided in said cylinder block and said cylinder head and two parts, corresponding to said cylinder block and said cylinder head of said working oil intake passage are disposed outside said water jacket.

7. The multi-cylinder engine for a motorcycle according to claim 5, wherein said working oil intake passage comprises:
   a first passage provided in said cylinder head and extending in a line along said side surface in a region between said side surface on which said hydraulic control valve is mounted and said waterjacket;
   a second passage provided in said cylinder block and being coaxially connected to said first passage; and
   a third passage provided in said crank case connected to said cylinder block and being coaxially connected to said second passage and extending in a line therefrom.

8. A multi-cylinder engine for a motorcycle, comprising:
   a cylinder block having a plurality of cylinder bores arranged in the width direction of a body frame;
   a cylinder bead connected to said cylinder block with combustion chambers formed between pistons slidably fitted in said cylinder bores and said cylinder head;
   a hydraulic valve resting mechanism capable of resting, in a specific operational region, at least one of a plurality of engine valves provided in said cylinder head, said engine valves being operatively provided for each of said combustion chambers; and
   a hydraulic control valve, mounted on said cylinder head, for controlling the hydraulic pressure of working oil supplied to said valve resting mechanism;
      said hydraulic control valve being mounted on a side surface of said cylinder head to which a plurality of intake ports individually corresponding to said combustion chambers are opened along the longitudinal direction of said body frame for selectively switching on/off the communication of hydraulic fluid to selective sides of said cylinder head, said hydraulic control valve being mounted on said side surface of said cylinder head at a position between two adjacent intake ports.

9. The multi-cylinder engine for a motorcycle according to claim 8, wherein a working oil intake passage for introducing working oil from an oil pump to said hydraulic control valve is provided in said cylinder head, said cylinder block, and a crank case.

10. The multi-cylinder engine for a motorcycle according to claim 8, wherein a hydraulic oil intake passage for introducing hydraulic oil from an oil pump to said hydraulic control valve is provided in said cylinder head, said cylinder block, and a crank case.

11. The multi-cylinder engine for a motorcycle according to claim 9, wherein a water jacket is provided in said cylinder block and said cylinder head and two parts, corresponding to said cylinder block and said cylinder head of said hydraulic oil intake passage are disposed outside said water jacket.

12. The multi-cylinder engine for a motorcycle according to claim 10, wherein a water jacket is provided in said cylinder block and said cylinder head and two parts, corresponding to said cylinder block and said cylinder head of said hydraulic oil intake passage are disposed outside said water jacket.

13. The multi-cylinder engine for a motorcycle according to claim 11, wherein said hydraulic oil intake passage comprises:
   a first passage provided in said cylinder head and extending in a line along said side surface in a region between said side surface on which said hydraulic control valve is mounted and said water jacket;
   a second passage provided in said cylinder block and being coaxially connected to said first passage; and
   a third passage provided in said crank case connected to said cylinder block and being coaxially connected to said second passage and extending in a line therefrom.

14. The multi-cylinder engine for a motorcycle according to claim 8, wherein a cylinder hole for containing valve means is provided in said cylinder head at a position between two adjacent intake ports, on the central side along the arrangement direction of said cylinder bores of an even number of four or more for partitioning said cylinder head into first and second head portions located on both sides of said cylinder hole, a first working oil discharge passage for supplying working oil to said valve resting mechanism for each of said combustion chambers on said first bead portion side is provided in said first head portion, said passage being connected to said hydraulic control valve mounted on said side surface of said cylinder head at a position between a pair of said intake ports of a plurality of said intake parts arranged on said first head portion side;
   a second hydraulic oil discharge passage for supplying working oil to said valve resting mechanism for each of said combustion chambers on said second head portion side is provided in said second head portion;
   one end of said first and second hydraulic oil discharge passages is opened to a mounting seat formed on said side surface of said cylinder head for crossing between said first and second head portions; and
   said first and second hydraulic oil discharge passages are communicated to each other via a cover fastened to said mounting seat.

\* \* \* \* \*